United States Patent
Killian et al.

(10) Patent No.: US 8,442,914 B2
(45) Date of Patent: May 14, 2013

(54) VIRTUAL WALLET ACCOUNT WITH AUTOMATIC-LOADING

(75) Inventors: Patrick Killian, Cottleville, MO (US); Sandeep Malhotra, Ballwin, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/108,328

(22) Filed: May 16, 2011

(65) Prior Publication Data

US 2012/0011063 A1    Jan. 12, 2012

Related U.S. Application Data

(60) Provisional application No. 61/361,699, filed on Jul. 6, 2010.

(51) Int. Cl.
*G06Q 40/00* (2012.01)

(52) U.S. Cl.
USPC ............................................ 705/41; 705/26.1

(58) Field of Classification Search ................. 705/26.1, 705/41
See application file for complete search history.

(56) References Cited

U.S. PATENT DOCUMENTS

| | | | |
|---|---|---|---|
| 2002/0052754 A1* | 5/2002 | Joyce et al. | 705/1 |
| 2009/0050687 A1* | 2/2009 | Kon et al. | 235/375 |
| 2009/0094123 A1 | 4/2009 | Killian et al. | |
| 2010/0088237 A1* | 4/2010 | Wankmueller | 705/75 |
| 2010/0114731 A1* | 5/2010 | Kingston et al. | 705/26 |
| 2010/0131397 A1 | 5/2010 | Killian et al. | |
| 2010/0280896 A1* | 11/2010 | Postrel | 705/14.29 |
| 2010/0317318 A1 | 12/2010 | Carter et al. | |

* cited by examiner

*Primary Examiner* — Jagdish Patel
*Assistant Examiner* — Sara C Hamilton
(74) *Attorney, Agent, or Firm* — Buckley, Maschoff & Talwalkar LLC

(57) ABSTRACT

Methods and apparatus for operating a virtual wallet system are described. In an embodiment, the process includes receiving, at a virtual wallet server, a virtual wallet account number and payment transaction details that includes a payment amount, and then mapping the virtual wallet account number to at least one funding account associated with a consumer. The method also includes validating the consumer and the payment transaction details, generating a standard purchase authorization request message and routing it to an issuer of the at least one funding account, and receiving an authorization response approving the payment transaction. The process further includes loading the consumer's virtual wallet account in real time to match the payment amount, and routing an authorization approval message to an originating acquirer. Such a virtual wallet system with automatic-loading capabilities substantially improves the operation of decoupled debit payment account schemes. In addition, the use of a virtual wallet account assigned to a consumer by virtue of a virtual wallet account number (which can be described as a pseudo-primary account number (pseudo-PAN)) allows the consumer to fund payments for multiple PSP accounts from a single funding account while simultaneously protecting personal data and protecting against identity theft.

17 Claims, 12 Drawing Sheets

VIRTUAL WALLET ACCOUNT WITH AUTOMATIC-LOADING

CROSS REFERENCE TO RELATED APPLICATION(S)

This application claims the benefit of U.S. Provisional Patent Application No. 61/361,699 filed on Jul. 6, 2010, the contents of which are hereby incorporated by reference for all purposes.

BACKGROUND

Embodiments disclosed herein generally relate to payment systems. In particular, some embodiments relate to methods, apparatus, systems, means and computer program products for an automatic-loading transaction payment system for consumers based on a virtual wallet account that includes automatic-loading features.

Payment card systems are in widespread use, and a prominent payment card system is operated by the assignee hereof, MasterCard International Incorporated, and by its member financial institutions. Payment Service Providers (PSPs) enable consumers or customers to pay merchants (and other consumers) for goods and services by using "decoupled debit" schemes. Such schemes feature payments that are initiated via proprietary PSP accounts, but the actual funding for the payment is debited from a consumer's stored value account or credit line which is typically held by a third-party institution. The decoupled debit schemes are typically organized as "prepaid" or "postpaid" systems.

FIG. 1 is a block diagram of a transaction handling system 100 for purposes of illustrating a consumer transaction process. FIG. 1 includes a merchant device 104 (which may be a point-of-sale (POS) terminal), a PSP 106, an issuer financial institution (FI) 108 which issued the customer's payment card account 110, a payment system 112 (which may be the well-known Banknet™ system operated by the assignee hereof) for routing transactions from acquirers to issuers, and an acquirer financial institution (FI) 114 which issued the merchant's account 116. Blocks 108 and 114 should also be understood to represent, respectively, computer systems operated by or on behalf of the customer issuer FI and the acquirer FI.

A consumer or customer (not shown) initiates a transaction by visiting a retail store (not shown) operated by the merchant, selects goods (not shown) that she wishes to purchase, and carries the goods to the merchant's POS terminal 104. The consumer presents a mobile device 102, such as a mobile telephone, that includes an integrated circuit (IC) or chipset of the kind embedded in contactless payment cards that allows the mobile device to be used as a contactless payment device. In particular, the mobile device 102 may store information associated with a consumer payment card account that can be utilized for consumer transactions. In some embodiments, the consumer taps the mobile device 102 on a proximity reader (not shown) associated with the merchant's POS terminal to initialize communications. In particular, the mobile device 102 transmits consumer information such as the payment card account number to the POS terminal 104. The POS terminal 104 then transmits 120 an authorization request to the PSP 106 which includes the payment card account number and the amount of the transaction, among other information. The arrows 118, 120, 122, 124 and 126 trace the path of the payment transaction as routed from the merchant device 104 through the PSP 106, to the customer issuer FI 108, and via the payment system 112 to the acquirer FI 114 that issued the merchant account 116. Assuming that all is in order, the acquirer FI 114 transmits a favorable authorization response to the POS terminal 104. The arrows 128, 130, 132 and 134 trace the path of acknowledgement messages from the acquirer 114 via the payment system 112 and the customer issuer FI 108 through the PSP computer 106 to the merchant device 104. Arrow 136 from the merchant issuer FI 114 represents a confirmation message sent directly from the merchant issuer 114 to the POS terminal 104 that confirms that the payment for the pending sale has been or will be credited to the merchant account 116. When the confirmation message is received at the POS terminal 104 it can be displayed for reading by the customer and a cashier, and the merchant then allows the sale to be completed so that the customer can leave the store with the goods.

A subsequent clearing transaction initiated by the merchant results in a transfer of the transaction amount from the customer's payment card account 110 to the merchant's account 116. The customer's payment card account 110 may be, for example, either a debit card account or a credit card account. If the customer used a debit card then the clearing transaction results in the funds being debited directly from the cardholder account 110 and transferred to the merchant account 116. If the customer used a credit card, then the clearing transaction results in a charge being posted against the cardholder account 110, which charge subsequently appears on the customer's monthly credit card statement.

Referring again to FIG. 1, in a prepaid system, funds debited from an underlying funding account may be credited to the consumer's stored value account on the PSP 106 in advance of any actual payment transactions. Examples of such systems are payments funded by a PayPal™ or iTunes™ stored value account, wherein the consumer funded the PayPal™ or iTunes™ account by debiting her Demand Deposit Account (DDA or bank account) or her debit or credit card account. Thus, in such prepaid systems, the transaction funding the PSP stored value account is a separate and distinct transaction from any purchase transaction, and it precedes use of the funds by the consumer.

In a postpaid system (in contrast to a prepaid system) funds are debited from an underlying funding account and credited to the stored value account on the PSP 106 after the actual payment transaction occurs. For example, a PayPal™ account may be linked to a consumer's bank account, debit card account, or credit card account so that the linked account can be used as the consumer funding account. Thus, in a postpaid system, the purchase transaction utilizing the consumer's funds precedes the PSP 106 obtaining the funds from the consumer funding account.

For both the prepaid and the postpaid systems, customer account credentials for an underlying funding account are typically stored on the PSP system. Consumers also understand that storing consumer payment credentials on a PSP system, or on multiple PSP systems, in order to facilitate prepaid and postpaid decoupled debit transactions creates personal payment risk to the consumer. The increased risk of having personal credit data compromised is well understood by consumers and leads to the perception of increased risk of identity theft. It has been found that this perception of increased identity theft risk is one of the major barriers to consumer adoption of such decoupled payment schemes.

In addition, in both the prepaid and the postpaid systems (decoupled debit schemes) described above the "funding transaction" and the "payment transaction" are treated as two separate and distinct transactions which can create a number of business problems for consumers, merchants, the PSP, and for the holder of the funding account. For example, requiring a consumer to prepay for a stored value on a PSP system forces the consumer to disburse funds over multiple accounts. The funds in a PSP stored value account cannot be used elsewhere, thus limiting the consumer's utility of those funds. In addition, having funds disbursed over multiple accounts requires the consumer to keep track of various account balances and activity, which decreases consumer convenience value. Further, in a prepaid decoupled debit system, consumer transactions may be declined due to insufficient funds in the stored value account even though adequate funds exist in the consumer's decoupled funding account. When a transaction is declined, the consumer is forced to load funds into the decoupled stored value account and reinitiate the payment transaction or use another method of payment, thus decreasing the utility and convenience value to the consumer.

Another problem with treating the funding and use transactions as two separate and distinct transactions (in both types of decoupled debit systems) is that the transaction details concerning the actual use of funds are hidden from the issuer FI of the underlying funding account. The inability of the funding account issuer FI to see transaction details associated with the use of the consumer's funds (such as the merchant ID, point of service mode, cardholder verification method, and the like) devalues the transaction to the funding account issuer FI. For example, the lack of transaction details prohibits the funding account issuer FI from offering loyalty points or other rewards to the consumer, prevents the funding account issuer FI from gaining value via data analytics, and circumvents fraud and risk management tools that depend on such transaction details.

In addition, the separate use and funding transactions of a postpaid decoupled debit system creates payment risk. In particular, the funding transaction is accomplished after the consumer's payment transaction is completed and thus the consumer already has possession of the goods or services before the payer has been paid. Accordingly, payment risk is created because the balance of the funding account may be insufficient to cover the amount already paid in the use transaction, and the settlement of those funds may require a multiple day lag time. Typically, the inherent payment risk associated with a postpaid decoupled debit system requires either delaying the merchant payment until funds are settled, or making the PSP bear the full risk.

Separate use and funding transactions associated with decoupled debit schemes also create complexity and potential consumer dissatisfaction concerning charge reversals and credits. In particular, if a prepaid decoupled debit system is utilized, reversals and credits can only be accomplished to the PSP account and not to the underlying funding account. If a postpaid decoupled debit system is utilized, then the lag time between settlement of the use transaction and settlement of the funding transaction can create sequencing problems. In particular, sequencing problems can occur when reversals or credits are settled before the original funding transaction is even settled and posted, or when debits and reversals or credits span multiple statement periods. In addition, the potential exists for the original funding transaction to be declined even though a reversal or credit transaction has already been settled and posted to the consumer account. Each of these cases can cause consumer dissatisfaction and/or heighten the payment risk to the PSP.

The present inventors recognized that a virtual wallet system with automatic-loading capabilities could be utilized to substantially improve the operation of decoupled debit payment account schemes. Use of a virtual wallet account assigned to a consumer by virtue of a virtual wallet account number (which can be described as a pseudo-primary account number (pseudo-PAN)) allows the consumer to fund payments for multiple PSP accounts from a single funding account while simultaneously protecting personal data and protecting against identity theft. Additional benefits and advantages concerning the use of a virtual wallet service that includes automatic-loading (or auto-load) capabilities, in various embodiments, accrue to end-users, PSPs, and funding account issuers for the operation of decoupled debit payment schemes, which will be apparent by reading the detailed specification below.

BRIEF DESCRIPTION OF THE DRAWINGS

Features and advantages of some embodiments of the present invention, and the manner in which the same are accomplished, will become more readily apparent upon consideration of the following detailed description taken in conjunction with the accompanying drawings, which illustrate exemplary embodiments and which are not necessarily drawn to scale, wherein.

DETAILED DESCRIPTION

Figure 1:
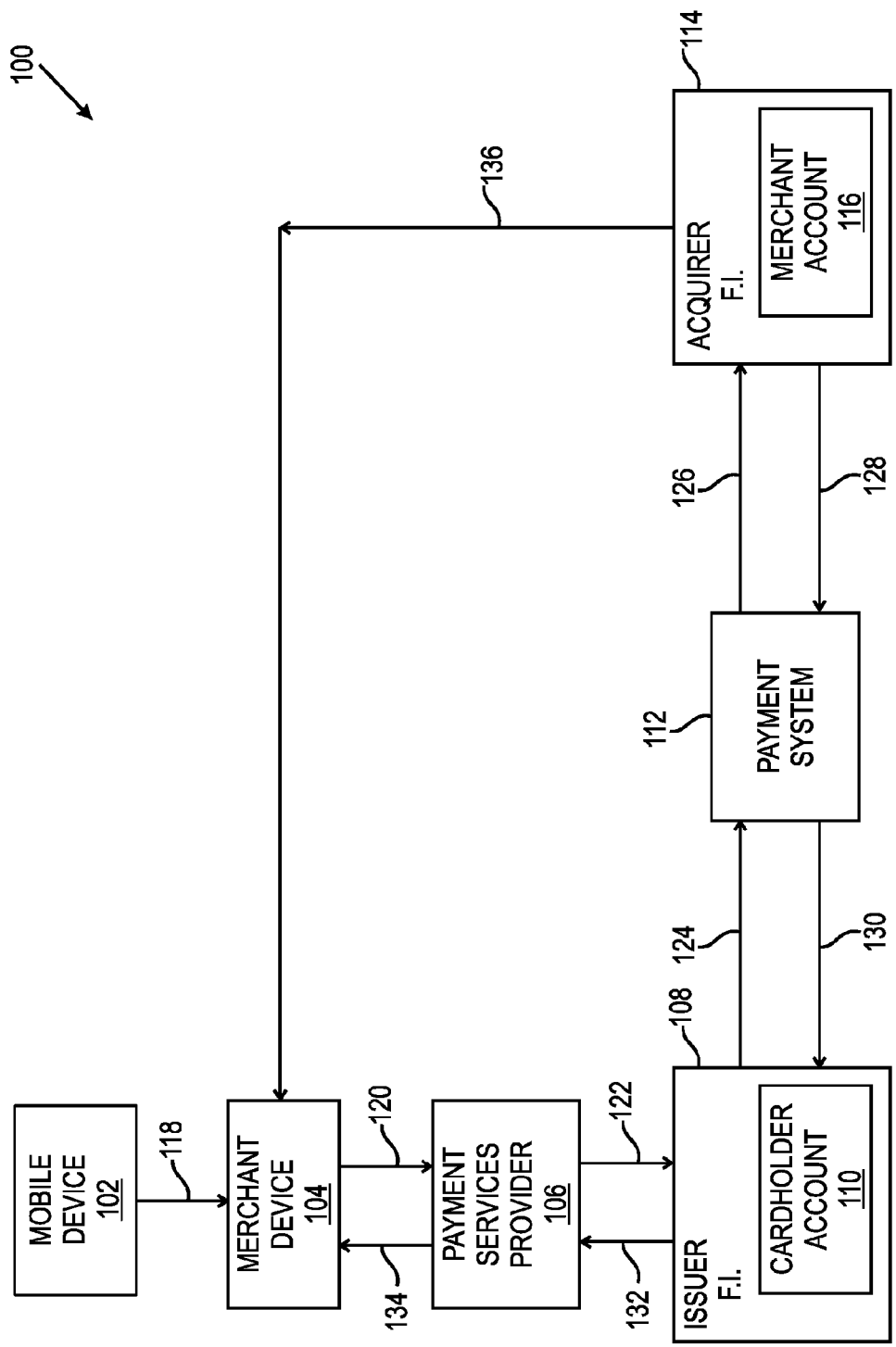
FIG. 1 is a block diagram of a typical decoupled debit payment system.

In general, and for the purpose of introducing concepts relating to the embodiments presented herein, a virtual wallet payment card system payment transaction is described. Such a virtual wallet payment card transaction may be initiated by a consumer (or customer) by use of a payment card, for example, a credit card, a debit card, and/or a smart card. In some embodiments, virtual wallet payment card transactions may be initiated by use of a consumer device configured for such transactions (such devices may include, for example, a mobile telephone, a personal digital assistant (PDA), a tablet computer or a laptop computer). For example, the consumer device may be a mobile telephone that can also be configured for use as a contactless payment device (i.e. a cell phone that includes a proximity payment circuit).

As described herein, in general an acquirer Financial Institution (FI) is the organization that transmits a purchase transaction to a payment card system for routing to the issuer of the payment card account in question. Typically, the acquirer FI has an agreement with merchants, wherein the acquirer FI receives authorization requests for purchase transactions from the merchants, and routes the authorization requests to the issuers of the payment cards being used for the purchase transactions. In some cases, the acquirer FI may contract out transaction handling services to a third party payment service provider (PSP). As used herein, including in the appended claims, "acquirer FI" includes both such FIs and third party payment service providers (PSPs) under contract to such FIs. The terms "acquirer", "acquirer FI", "acquiring FI", and "merchant's bank" will be used interchangeably herein. The terms "issuer", "issuer FI" and "issuing FI" will also be used interchangeably herein to refer to the financial institution that issued a payment card account (cardholder account). In some aspects, a payment services provider (PSP) computer may facilitate and/or relay communications between an acquirer FI and the virtual wallet server computer, and/or may facilitate applying business rules and/or user profile parameters to a customer's virtual wallet account. In some embodiments, the PSP computer and/or the virtual wallet server computer may be operated by a payment card organization (for example, the assignee of the present case).

In some embodiments, before a consumer uses her payment card or consumer device (such as a mobile telephone) to initiate a virtual wallet payment transaction, the consumer registers her payment card account with the virtual wallet system (which can, for example, include a virtual wallet server computer that can be accessed via a website). When registering for the virtual wallet account, the consumer provides required payment services provider (PSP) registration information such as a site-specific alias name, and provides funding account payment credentials that correspond to her funding accounts (i.e., one or more payment card accounts) held by one or more financial institutions (FIs). The consumer may also select automatic-loading (or auto-load) capabilities and certain parameters that she desires to be associated with her virtual wallet account. The virtual wallet server responds to the registration process by generating a payment authorization request for handling by a PSP and at least one funding account issuer, and upon approval generates a consumer profile and a virtual wallet account number (which is a pseudo-primary account number (pseudo-PAN)). The virtual wallet server then stores the auto-load capabilities and parameters selected by the consumer, and notifies the consumer that her user profile has been activated. In some embodiments, the consumer may be notified by transmission of a message to her consumer device, for example, a text message may be transmitted to her mobile telephone and/or an email may be transmitted to her email account for viewing on her PDA or laptop.

After opening her virtual wallet account, the consumer can perform transactions such as auto-load purchase transactions and auto-load peer-to-peer transactions, and can schedule loading transactions, and the like. For example, the consumer can use her customer payment card or contactless-enabled mobile telephone to perform an auto-load purchase transaction in order to purchase goods from a merchant retail location. She brings the merchandise to a point-of-sale (POS) terminal and presents her payment card or taps her mobile telephone on a proximity/contactless reader component associated with the POS terminal. A magnetic stripe on her payment card is read by a reader associated with the POS terminal, or a signal from the proximity reader stimulates the mobile telephone to exchange wireless RF communications with the proximity reader, and the information thus obtained from the consumer is transmitted to an acquirer FI (that holds the merchant account). The acquirer FI submits a purchase authorization request to a payment network with the virtual wallet account number (pseudo-PAN) as the funding account. The payment network then routes the request to the virtual wallet server acting as a virtual wallet account issuer's agent. The virtual wallet server processes the information to validate the consumer, generates a standard authorization request message for the purchase for the entity or entities funding the PAN (which request includes original transaction details information), and routes it to a payment network authorization system. The payment network authorization system then routes the authorization request to each funding account issuer which uses standard business processes to approve or decline the request. If the payment authorization request is approved, the funding account issuer generates an authorization response message to the payment network authorization system, which routes the authorization response message to the virtual wallet server (acting as an acquirer FI proxy). The virtual wallet server then processes the authorization response message and routes it to the original payment network in response to the original authorization request message. The original payment network then routes the authorization response message to the originating acquirer FI. Thus, the virtual wallet system operates to facilitate the authorization of auto-load purchase transactions in real time, at the time of use. In particular, a real-time funds transfer is handled by the virtual wallet server to achieve payment transaction authorization, and in some cases two or more funding sources may be involved (which will be explained below). In addition, in some embodiments the process permits the funding sources to apply business rules (which will also be explained below).

In some embodiments, the virtual wallet server causes data to be routed to the issuer of the merchant's payment card account so that the transaction amount can be credited to the merchant's payment card account. Upon authorization and/or completion of the payment transaction, the merchant's issuer may confirm to the merchant that the funds transfer has occurred (or will occur subsequently during clearing operations). In response to receiving the confirmation, the merchant may transfer ownership of the goods to the consumer, or may accept the confirmation as payment for services rendered (or to be rendered) to the consumer. Certain advantages that flow from the use of the virtual wallet system described herein have been mentioned above and will be discussed in more detail below, along with benefits, other advantages and advantageous features.

Figure 2:
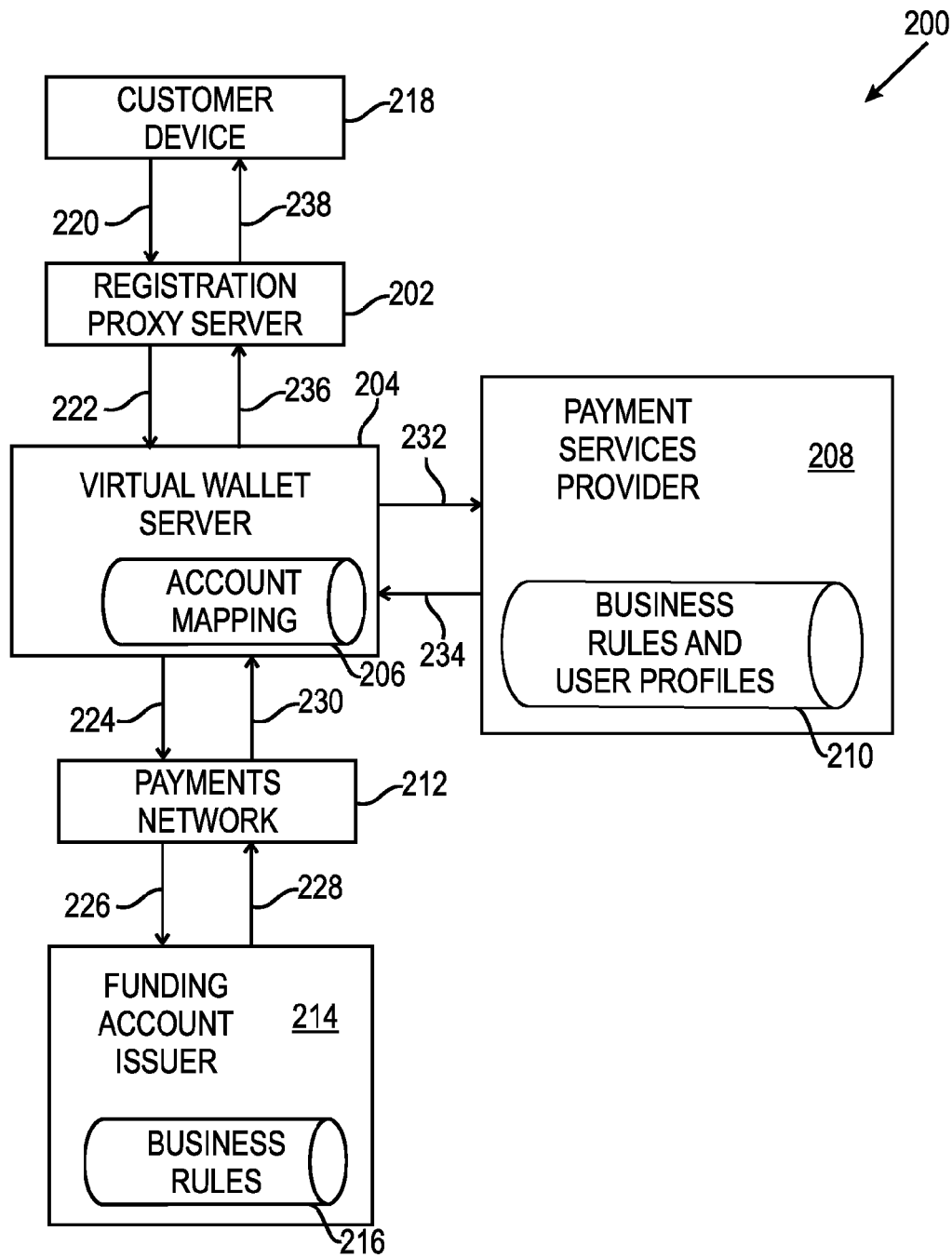
FIG. 2 is a block diagram of a virtual wallet registration system according to an embodiment of the invention.

FIG. 2 is a block diagram of an embodiment of a virtual wallet registration system 200 for registering a consumer's payment card account for use to make virtual wallet account payment transactions with auto-loading, in support of decoupled debit payment systems. In particular, the registration system 200 includes a registration proxy server 202, a virtual wallet server 204 having an account mapping database 206, a payment services provider (PSP) computer 208 with a business rules and user profiles database 210, a payments network 212, and a funding account issuer 214 having a business rules database 216. In some embodiments, a user or consumer initiates registration by using a consumer device 218 (such as a mobile telephone, tablet computer, laptop computer or desktop computer with a browser client application, a PDA, or the like) and inputs registration information required by a PSP payment service. The consumer also inputs required funding account payment credentials, and selects auto-load capabilities and parameters (which will be explained below). Arrows 220, 222, 224, 226, 228, 230, 232, 234, 236 and 238 trace the path of the registration process starting from when the consumer initiates registration from a customer device 218 such as a mobile phone, through the various components of the system 200, and such that an approval message or a decline message is eventually displayed to the consumer on her customer device 218. Various details of the process are discussed below with regard to FIG. 3.

Figure 3:
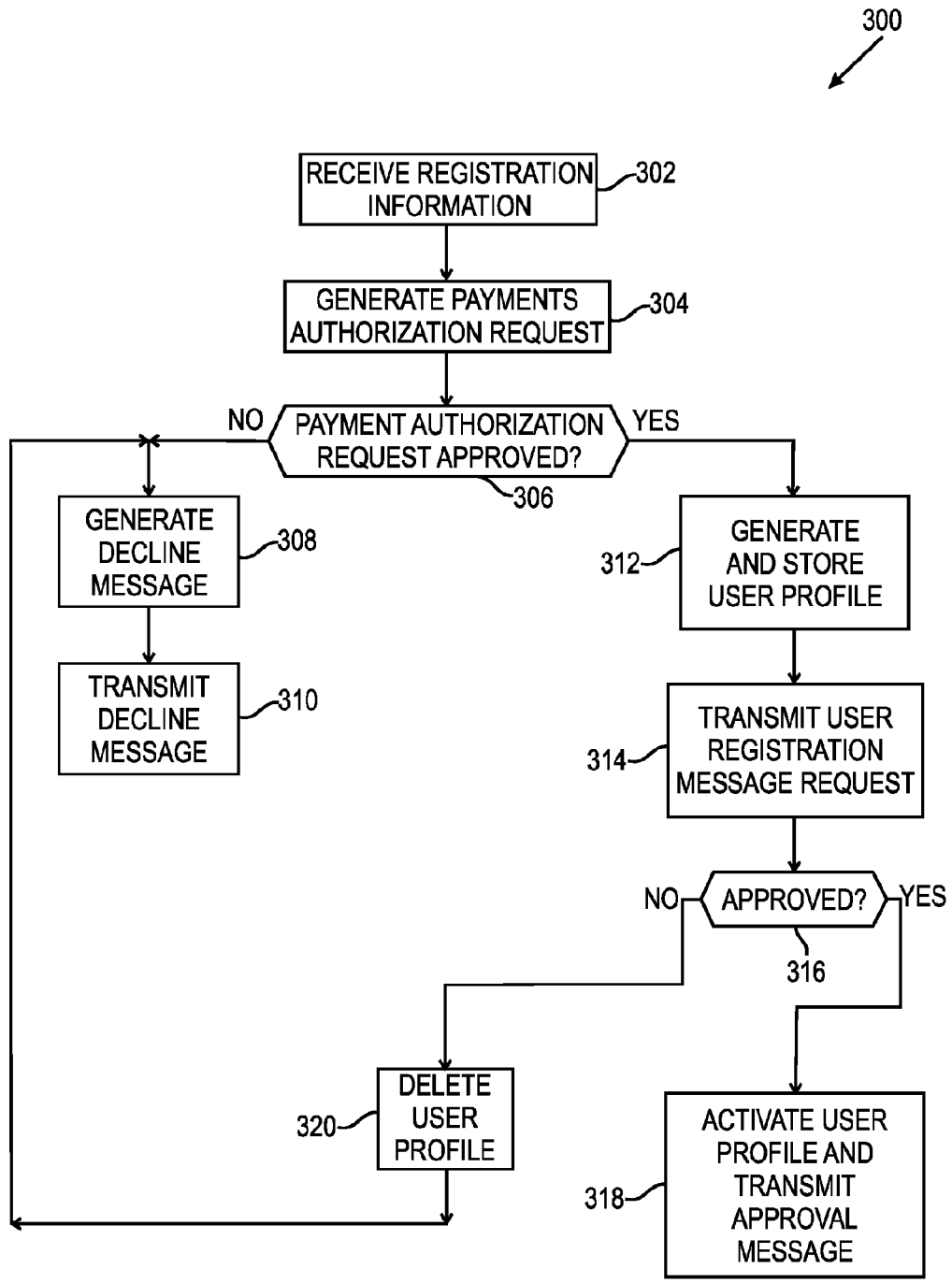
FIG. 3 is a flowchart illustrating a virtual wallet with automatic-loading account registration process according to an embodiment of the invention.

FIG. 3 is a flowchart illustrating an embodiment of a virtual wallet account registration process 300. The consumer utilizes, for example, a mobile device to provide registration information required by a PSP payment service including a site-specific alias name and funding account payments credentials. In some embodiments, the consumer may be presented with a menu from which she can select certain options to be applied to her account, such as auto-load capabilities and parameters. In some embodiments, the registration information may be collected by a registration proxy server 202 (shown in FIG. 2) operated by a trusted agent, including but not limited to a virtual wallet server computer, a funding account issuer (for example, a bank website), or a funding account issuer agent. In FIG. 3, the virtual wallet server receives 302 the registration information and then generates 304 a payments authorization request message that includes the funding account PAN, and routes the payment authorization request message to a payments network 212 (see FIG. 2). In some embodiments, referring to FIG. 2, the payments network 212 routes the payment authorization request message to the funding account issuer 214 based on the funding account PAN. The funding account issuer 214 then validates the payment credentials, applies business rules, and makes the decision to approve or decline the payment authorization request. The funding account issuer sends a payment authorization response message, which is either an approval or a decline message, to the payments network 212, which routes the decision to the virtual wallet server 204. Referring again to FIG. 3, if in step 306 the payment authorization request is declined, then the virtual wallet server generates 308 a decline message and transmits 310 the decline message to the registration proxy server. Referring again to FIG. 2, in some embodiments, the decline message is transmitted from the registration proxy server 202 to the customer device 218 for display to the consumer.

However, if in step 306 the payment authorization response is approved, then the virtual wallet server generates and stores 312 a user profile in an account mapping data store 206 (see FIG. 2). In some embodiments, the virtual wallet server also generates a virtual wallet account number (a pseudo-PAN), writes the virtual wallet account number to an account mapping data store, and stores the auto-load capabilities and parameters. Next, the virtual wallet server generates and transmits 314 a user registration message request and routes it to a PSP along with a user alias name. In some embodiments, the PSP applies business rules to the registration information, writes the user alias name, the user registration data, and the virtual wallet account number to a user profile data store, and sends the user registration response to the virtual wallet server. If, in step 316, the user registration response from the PSP is an approval, then the virtual wallet server activates 318 the user profile in the account mapping data store and transmits an approval message to the registration proxy server which, in some embodiments, routes the approval message for transmittal to a customer device such as a mobile telephone for display to the consumer. However, if in step 316 the user registration response from the PSP is a decline, then the virtual wallet server deletes 320 the user profile in its account mapping data store, generates 308 a declines message, and in some embodiments, the registration proxy server transmits 310 the decline message to the user's browser for display to the consumer.

Accordingly, the virtual wallet registration process enables a consumer to securely and privately register for a virtual wallet account, to nominate the underlying funding account (s), and to establish criteria and parameters for auto-load capabilities. Enabling a consumer to apply options and parameters associated with auto-load capabilities for her virtual wallet account is advantageous because it permits the consumer to better manage and control her money.

Figure 4:
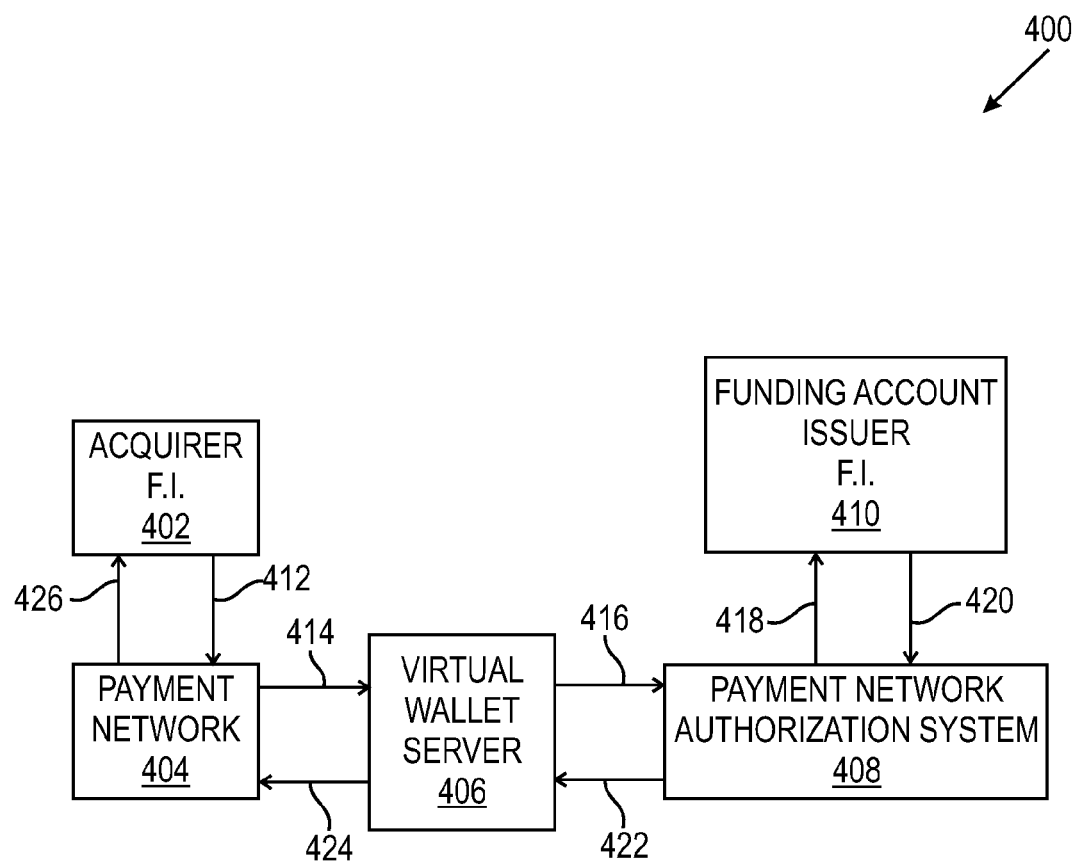
FIG. 4 is a block diagram that illustrates a virtual wallet system configured for processing a virtual wallet purchase transaction with auto-load capabilities according to an embodiment of the invention.

FIG. 4 is a block diagram that illustrates a virtual wallet system 400 that is configured for processing a virtual wallet purchase transaction with auto-load capabilities in accordance with novel aspects disclosed herein. It should be understood that the system 400 could also be utilized to process other types of transactions, for example, an auto-load reversal (or credit) transaction (which will be described below). In addition, the various components of FIG. 4 may be a subset of a larger system generally indicated by reference numeral 400, for example, for facilitating consumer purchases via decoupled debit payment schemes by processing auto-load virtual wallet purchase transactions.

In the virtual wallet system embodiment 400 of FIG. 4, the components operate with respect to a single payment network. However, in some embodiments, a consumer can utilize a single virtual wallet account to fund payments for multiple payment networks and/or multiple PSP accounts while still protecting personal data and protecting against identity theft. This is true because the underlying funding account credentials and personal consumer data are hidden from acceptors of the virtual wallet account. In addition, in some embodiments, a consumer can utilize multiple virtual wallet accounts issued and managed by a PSP or several PSPs to be decoupled from, but linked to, a common funding account issued and managed by a third party.

Referring again to FIG. 4, the payment system 400 includes an acquirer FI 402 which holds a merchant account (not shown), a payment network 404, a virtual wallet server 406, a payment network authorization system 408, and a funding account issuer FI 410. The acquirer FI 402 and the funding account issuer FI 410 should also be understood to represent, respectively, computer systems operated by or on behalf of the merchant issuer FI and the consumer issuer FI. In some embodiments, the virtual wallet server 406 is a computer system operated by or on behalf of a payment card organization (for example, the assignee of the present case). The arrows 412, 414, 416 and 418 trace the path of a purchase authorization request transaction, starting from when the acquirer FI 402 routes the purchase authorization request through the payment network 404 to the virtual wallet server 406 to payment authorization system 408 and to the funding account (consumer) issuer 410. The arrows 420, 422, 424 and 426 trace the path of an approval message or decline message, depending on processing by at least one of the funding account issuer 410, payment network authorization system 408, and the virtual wallet server 406, as will be explained below.

In general, and by way of example, the process can include the acquirer FI 402 receiving details of a purchase transaction from a POS terminal of a merchant. But it should be understood that the process can be utilized for other types of purchase transactions, such as remote transactions wherein a consumer's payment card is not physically present. For example, the process can be utilized for electronic commerce transactions, telephone order transactions, mail-order transactions, and transactions wherein a consumer utilizes her payment-enabled mobile telephone to wirelessly transmit payment account information to a merchant device (which in some embodiments could also be a mobile telephone). In some embodiments, the purchase transaction details include a virtual wallet account number (the pseudo-primary account number (PAN) of the consumer) as the funding account. Other purchase transaction details may include, for example, a merchant ID, a point of service mode identifier, the cardholder verification method, a transaction amount, a transaction type, product information, and all other details currently provided for or allowed by the ISO 8583 transaction message standard. The ISO 8583 standard specifies a common interface by which financial transaction card originated messages may be interchanged between acquirers and card issuers, message structure, format and content, data elements and values for data elements.

Referring again to FIG. 4, the acquirer FI 402 generates an authorization request which includes the purchase transaction details to payment network 404, which routes the authorization request to a virtual wallet service server 406. The virtual wallet server 406 then acts as a virtual wallet account issuer's agent and processes the authorization request to validate the consumer and the transaction. If the consumer and transaction are validated, then the virtual wallet server routes a standard authorization request to the payment network authorization system 408 for input from the users (or entities) funding the virtual wallet account (identified by the pseudo-PAN). The standard authorization request may include the original merchant ID and other purchase transaction details (original transaction details) from the original authorization request received from the acquirer FI 402. The payment network authorization system 408 routes the authorization request to the funding account issuer(s) 410, which either approves or declines the authorization request. If the authorization request is declined, then a decline message is sent to the originating acquirer FI 402. However, if the authorization request is approved, then the virtual wallet server 406 conducts further processing to determine if the consumer's virtual wallet account has a balance sufficient to cover the purchase transaction. If the balance is insufficient, then a decline message is sent through the payment network 404 to the originating acquirer FI 402. However, if the consumer's virtual wallet account has a balance sufficient to cover the purchase transaction, then an authorization approval is routed to the original payment network 404 and an authorization message is routed to the originating acquirer FI 402.

Figure 5:
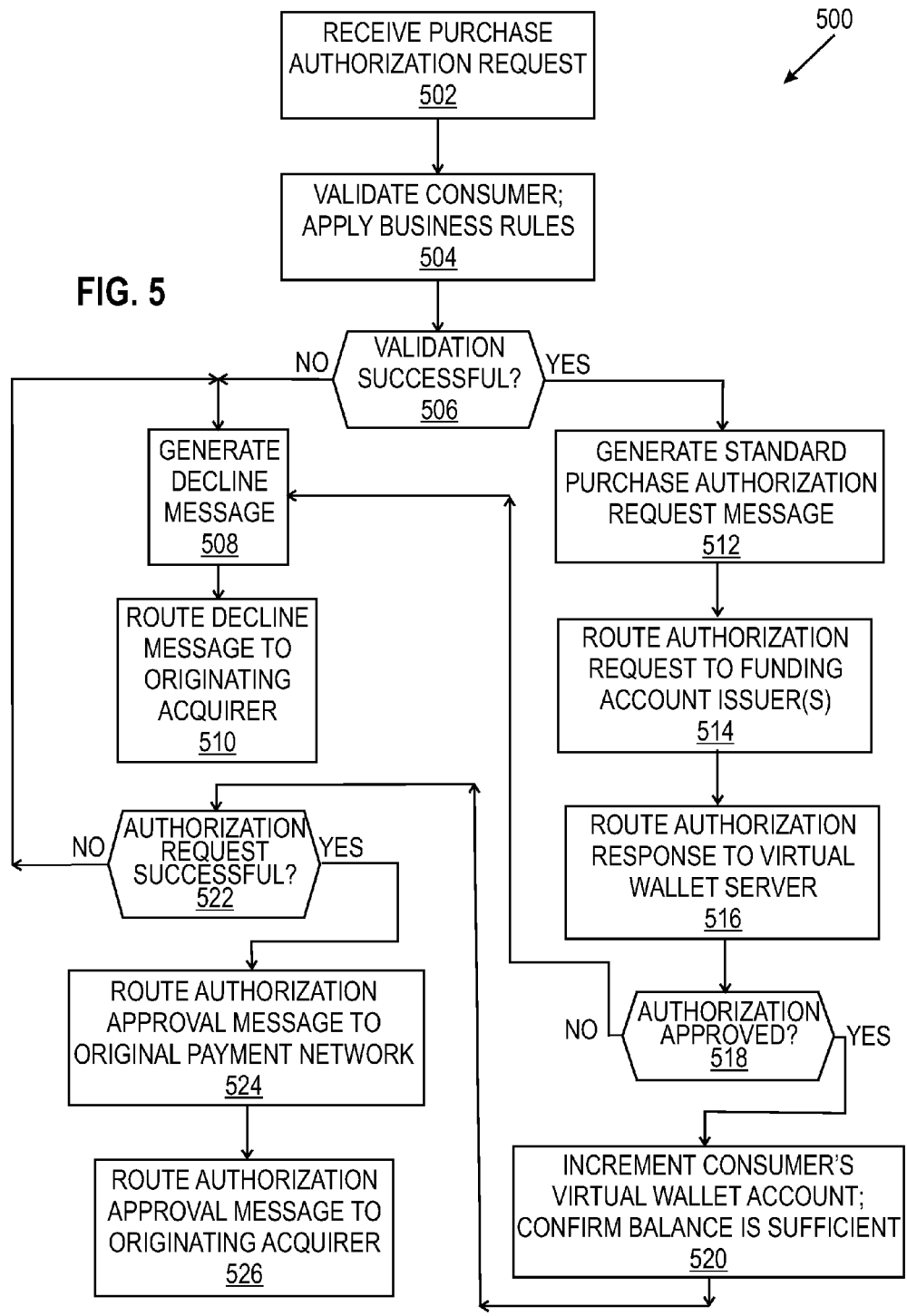
FIG. 5 is a flowchart illustrating an automatic loading virtual wallet purchase transaction process according to an embodiment of the invention.

FIG. 5 is a flowchart illustrating an embodiment of an auto-load virtual wallet purchase transaction process 500. An acquirer FI submits a purchase authorization request to a payment network with a virtual wallet account number (pseudo-PAN) as the funding account. The payment network then routes the authorization request so that it is received 502 by a virtual wallet server which then acts as a virtual wallet account issuer's agent. In some embodiments, the virtual wallet server processes the authorization request by first interrogating a PAN mapping database and mapping the virtual wallet account PAN to one or more funding account PANs. The virtual wallet server then validates 504 the consumer and applies issuer-defined business rules. The application of business rules can include, for example, applying CVC data, transaction limits, and risk scoring, and/or may include adding convenience fees and/or subtracting promotional and/or loyalty credits, and the like, to the amount of the funding transaction. Thus, the virtual wallet server utilizes PAN mapping and applies business rules (if any) to an account in order to determine if the authorization request is for a valid user (consumer) and a valid transaction. In step 506, if the user is not validated (consumer validation is unsuccessful), then the virtual wallet server generates 508 a decline response and a decline message is routed 510 to the originating acquirer.

However, if in step 506, the PAN mapping and user validation are successful, then the virtual wallet server (acting as a pseudo-acquirer) generates 512 a standard purchase authorization request message for the purchase of stored value with users funding the PAN. The request message includes the original merchant ID and other purchase transaction details (i.e., the original transaction details) from the original authorization request transmitted by the acquirer FI. The virtual wallet server (now acting as an acquirer-proxy) also routes the authorization request message with the original transaction details and the funding account PAN to a payment network authorization system according to standard processes. The payment network authorization system then routes 514 the authorization request to the funding account issuer(s). Each funding account issuer applies standard business processes to either approve or decline the request, and then each issuer generates an authorization response message to the payment network authorization system. Thus, such a process permits issuers of the underlying funding account to utilize the details of the original use transaction in the auto-load transaction to make authorization decisions that can be based on the original use transaction details. In addition, the funding account issuers can view the transaction details of the original use (payment) transaction during the funding transaction authorization process, which enhances the issuer's ability to maximize account value, better manage fraud and payment risk, and utilize the transaction details for data analytic purposes. Furthermore, each decoupled debit PSP and the common funding account issuer can apply business rules and account features to the payment and funding transactions independently, which permits each party to add value to the consumer payment experience. Such a process also enables the funding account issuer to apply meta-business rules across all decoupled debit PSPs prior to completion of the auto-load transaction, which enhances consumer protections and risk management. For example, the funding account issuer may apply particular meta-rules such as: (1) use a specific funding account based on merchant type and/or transaction type (for example, if the purchase is at a pharmacy then use the health savings funding account, but if the purchase is at a department store then use the consumer's debit card account); (2) decline transactions above a predetermined threshold limit; (3) decline international transactions (or conversely, approve them); (4) approve e-commerce transactions (or conversely, decline them); and (5) approve transactions depending on the time of day (or conversely, decline them). In addition, the meta-rules could provide limits on value, volume or velocity of purchases, for example, allow transactions below $200, and/or allow up to 10 transactions per virtual wallet account per day, and the like. Referring again to FIG. 5, the payment network authorization system next routes 516 the authorization response(s) to the virtual wallet server (now acting as acquirer proxy). If, in step 518 the payment network authorization response is not approved (i.e., a decline, or negative response), then the process branches to item 508 wherein the virtual wallet server generates a decline message which is routed 510 to the originating acquirer. In some embodiments, the originating acquirer then transmits the decline message to a merchant device (such as a POS terminal) and/or to a consumer device (such as a mobile telephone).

However, if in step 518 the payment network authorization response is an approval (a positive response), then the virtual wallet server loads or increments 520 the value of the end user's (consumer's) virtual wallet account in real-time. In some embodiments, the amount loaded or incremented matches the exact amount of funds needed to fund the use (payment) transaction. In other words, the consumer's virtual wallet account is automatically loaded in real time with the exact amount required to fund the payment transaction. In addition, the virtual wallet server may also resume processing of the original acquirer authorization request with the virtual wallet account PAN. The virtual wallet server (acting as the issuer proxy) then confirms that the virtual wallet account stored value balance is sufficient to cover the purchase transaction, and in some embodiments also applies other issuer-defined business rules to determine if the authorization request should be approved or declined. If the virtual wallet server issuer proxy cannot confirm the authorization request (i.e., it is declined) in step 522, then the virtual wallet server generates 508 a decline message which is routed 510 to the originating acquirer.

However, if in step 522 the virtual wallet server issuer proxy approves the authorization request, then an authorization approval message is routed 524 by the virtual wallet server to the original payment network (responsive to the original authorization request message). The payment network then routes 526 the authorization response message to the originating acquirer.

As mentioned above, a successful virtual wallet auto-load payment transaction process results in the virtual wallet account(s) being automatically loaded with the precise amount of funds needed to fund (or to cover) a given payment transaction. Accordingly, in some embodiments, each payment transaction initiates an auto-load process to fund the virtual wallet account with the exact amount of funds required. It is also important to recognize that as part of the auto-load process, original payment (or use) transaction details are provided to the issuer of the underlying funding account(s) which can be used when applying issuer-defined business rules to approve or decline a particular funding transaction. In addition, in some embodiments, the auto-load process may be initiated based on prearranged conditions or account status of a given virtual wallet account (e.g. loading occurs to increase the amount of funds to meet a minimum balance requirement preset by a consumer, or loading occurs for a predetermined amount of money on a particular day/time of the month, and the like). Accordingly, the auto-load capability is designed such that the funding transaction is linked to and sequenced with the payment transaction. This enables the virtual wallet account auto-load function to support and leverage traditional card-based payment network rules and standards addressing payment guarantees, and to support next day settlement capabilities to minimize payment and settlement risk associated with insufficient funds in the funding account. In addition, the virtual wallet system supports charge reversals and credit processes (which will be discussed below).

It should be understood that some (or all) of the virtual wallet server processing steps described above with regard to FIG. 5 can be eliminated if the virtual wallet server determines that the authorization request from the originating acquirer FI is for an "on-us" payment transaction. In such a case, the authorization request is granted immediately by the virtual wallet server and an authorization response message is transmitted to the original acquirer FI. An "on-us" funding transaction is defined as a purchase transaction (which may be subject to a limit or limits or other restrictions) in which an approval decision (payment authorization) can be made without consulting a funding account holder (such as a credit card issuer FI). For example, the credit card issuer FI may have one or more agreements in place with one or more PSPs and/or acquirer FIs to approve all purchase transactions at specified convenience food stores for purchases of $20 (twenty) dollars or less. Such "on-us" payment transaction agreements can be put in place to speed up processing of purchases for the convenience of the merchants and/or for the convenience of consumers. In such cases, after the payment authorization request is granted the virtual wallet server performs further processing to debit the consumer's funding account.

Figure 6:
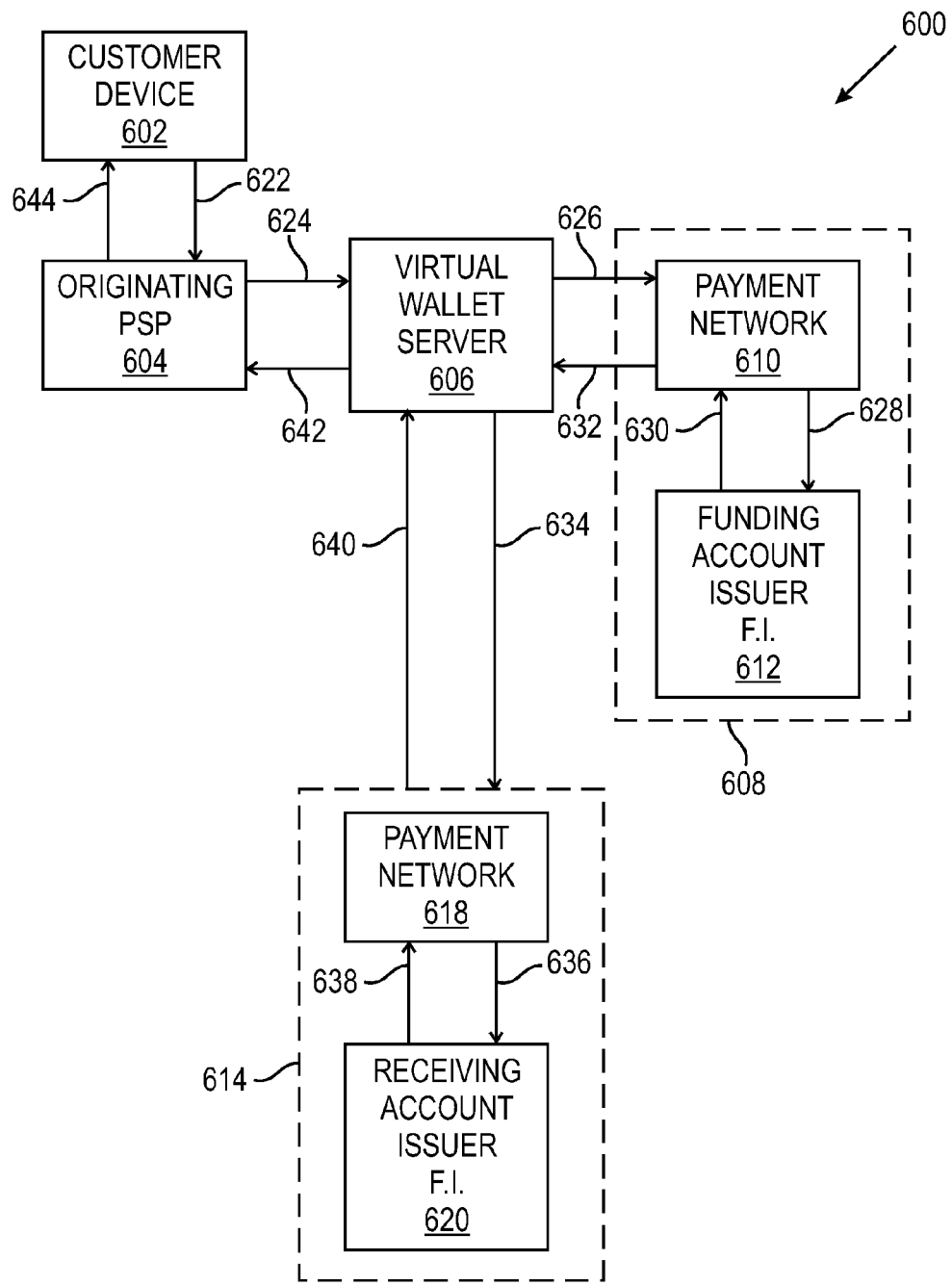
FIG. 6 is a block diagram that illustrates a virtual wallet peer-to-peer system for processing a peer-to-peer purchase transaction with automatic-loading according to an embodiment of the invention.

FIG. 6 is a block diagram that illustrates a virtual wallet peer-to-peer system 600 for processing a peer-to-peer purchase transaction with auto-load in accordance with novel aspects disclosed herein. A peer-to-peer transaction may be defined as a person-to-person transaction. For example, a consumer who purchases an item or service directly from another person (who may be merchant) on an auction website has engaged in a peer-to-peer transaction. The various components shown in FIG. 6 may be a subset of a larger system generally indicated by reference numeral 600, for facilitating peer-to-peer transactions via decoupled debit payment schemes by using an automatic-loading virtual wallet purchase transaction process. In the example embodiment illustrated in FIG. 6, the components of the system 600 that are shown operate with respect to a single peer-to-peer payment scheme. However, in some embodiments, a consumer can fund payments to a receiver of a payment from multiple payment networks and/or multiple PSP accounts from a single virtual wallet account. Thus, the need for consumers to register funding account credentials with multiple decoupled debit PSPs is eliminated. Accordingly, as mentioned above, a virtual wallet account protects the consumer's personal data and protects against identity theft since the consumer's payment credentials are associated only with one virtual wallet account instead of with multiple PSP systems. In addition, in some embodiments, a consumer can utilize multiple virtual wallet accounts issued and managed by a PSP or several PSPs that are decoupled from, but linked to, a common funding account issued and managed by a third party, and the third party would then make the payment to the receiver.

Referring again to FIG. 6, the payment system 600 includes an originating PSP 604, which receives information from a consumer device 602 (such as a PDA or smart phone) used by the consumer to initiate a peer-to-peer use transaction. The system 600 also includes a virtual wallet server 606, a first authorization system 608 that includes a payment network 610 and a funding account issuer FI 612, and a second authorization system 614 that includes the payment network 618 and a receiving account issuer FI 620. The originating PSP 604, the virtual wallet server 606, and the components of the first authorization system 608 (the payment network 610 and the funding account issuer 612) can, in some embodiments, also be understood to represent, respectively, computer systems operated by or on behalf of a consumer issuer FI. The arrows 622, 624, 628, 630 and 632 trace the path of a peer-to-peer purchase authorization request transaction, which begins when the originating PSP 604 routes a purchase authorization request to the virtual wallet server 606 and to the first authorization system 608 which includes the payment network 610 and a funding account (consumer) issuer FI 612.

The arrows 634, 636, 638, 640 and 642 trace the path of peer-to-peer authorization request processing as it relates to a receiving account issuer FI 620, which begins with the generation of a payment transaction authorization request from the virtual wallet server 606 to the second authorization system 614 which includes the payment network 618 and the receiving account issuer FI 620. Lastly, the arrows 642 and 644 trace the path of an approval message or a decline message to the consumer, depending on the results of the processing by at least one of the virtual wallet server 606, the first authorization system 608, and/or the second authorization system 614. Details involving peer-to-peer purchase transaction processing will be explained below with reference to FIG. 7.

Figure 7:
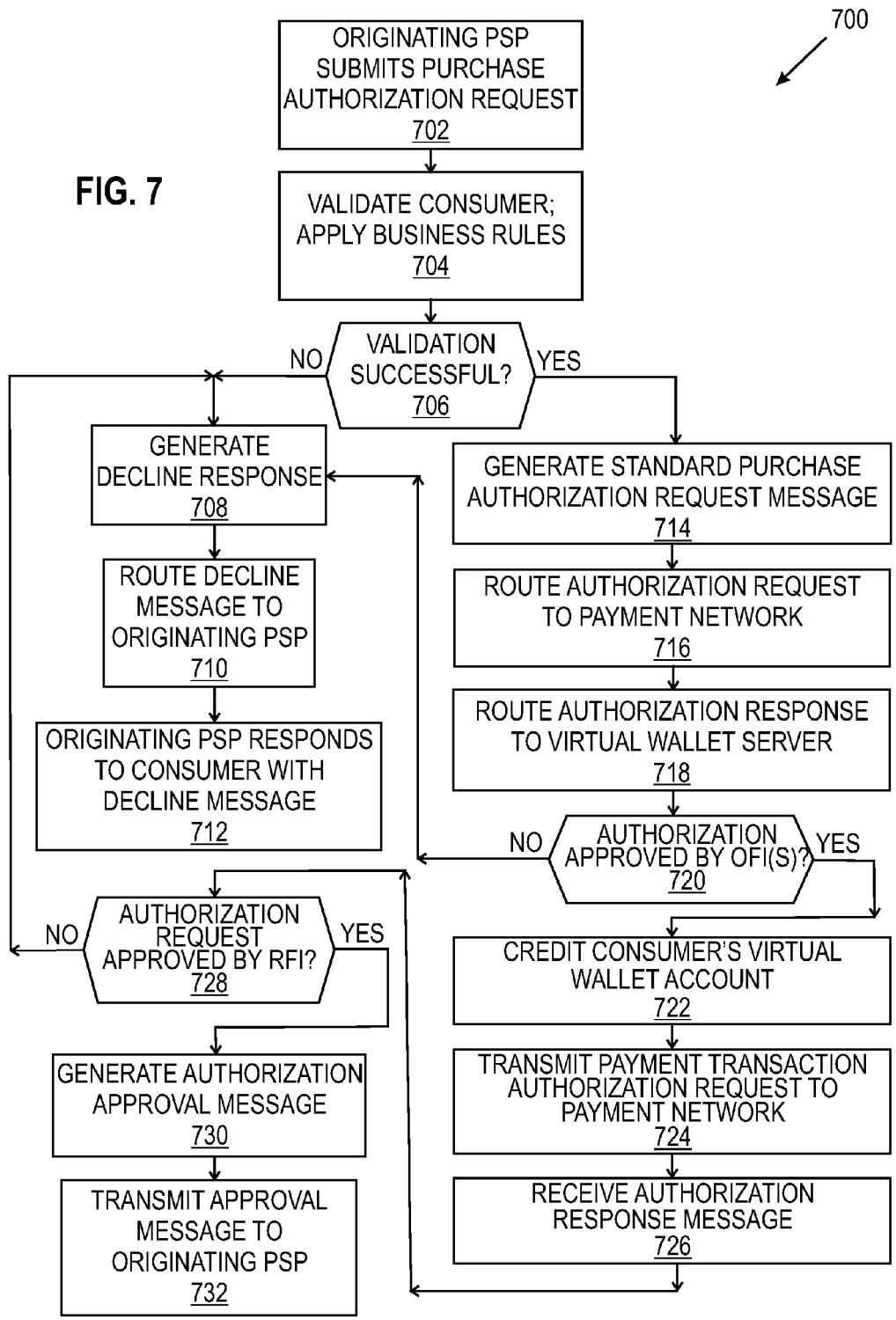
FIG. 7 is a flowchart illustrating an automatic loading virtual wallet peer-to-peer purchase transaction process according to an embodiment of the invention.

FIG. 7 is a flowchart illustrating an embodiment of an auto-loading virtual wallet peer-to-peer purchase transaction process 700. A consumer initiates a peer-to-peer use transaction to an originating PSP, which submits 702 a purchase authorization request to the virtual wallet server with a virtual wallet account number (pseudo-PAN) as the funding account. The virtual wallet server processes the authorization request by interrogating a PAN mapping database and mapping the virtual wallet account PAN to one or more funding account PANs. The virtual wallet server then validates 704 the consumer and applies issuer-defined business rules. For example, the business rules can include applying CVC data, transaction limits, and risk scoring, and/or may include adding convenience fees and/or subtracting promotional and/or loyalty credits, and the like. Thus, the virtual wallet server utilizes PAN mapping and applies the business rules (if any) to an account in order to determine if the authorization request is for a valid user (consumer) and a valid transaction. In step 706, if the user is not validated (the validation is unsuccessful), then the virtual wallet server generates 708 a decline response and routes 710 the decline response to the originating PSP. The originating PSP then responds 712 to the consumer with a decline message. Thus, in this case the transaction is denied.

However, if in step 706, the PAN mapping and user validation are successful, then the virtual wallet server (acting as a pseudo-acquirer) generates 714 a standard authorization request message for the purchase of stored value with users funding the PAN. The request message includes the original merchant ID and other purchase transaction details (i.e., the original transaction details) from the original authorization request received from the originating PSP. The virtual wallet server (now acting as an acquirer-proxy) routes 716 the authorization request message with the original transaction details and the funding account PAN to a payment network authorization system according to standard processes. The payment network authorization system then routes the authorization request to the funding account issuer(s), and each funding account issuer can apply standard business processes to either approve or decline the request, and then each issuer generates an authorization response message to the payment network authorization system. The payment network authorization system next routes 718 the authorization response(s) to the virtual wallet server (now acting as acquirer proxy). If, in step 720 the payment network authorization response from the originating financial institution (OFI) is not approved (i.e., a decline, or negative response), then the process branches to step 708 wherein the virtual wallet server generates a decline response which is routed 710 to the originating PSP, which in turn responds 712 to the consumer with a decline message. In some embodiments, the originating PSP transmits the decline message to a consumer device (such as a mobile telephone) and/or to a merchant device (such as a POS terminal or a laptop computer).

However, if in step 720 the payment network authorization response from the OFI is an approval (a positive response), then the virtual wallet server credits or loads 722 the consumer's virtual wallet account and loads or increments the stored value of the consumer's virtual wallet account, in real-time. In some embodiments, the virtual wallet server also resumes processing of the original authorization request by initiating a payment transaction authorization request with the virtual wallet account PAN. The virtual wallet server (acting as the originating financial institution (OFI) proxy) then transmits 724 the payment transaction authorization request to the payment network authorization system. The payment network authorization system then routes the authorization request to a receiving financial institution (RFI), and the RFI applies standard business processes to either approve or decline the request. The RFI generates an authorization response message to the payment network authorization system, which routes that response message to the virtual wallet server (acting as OFI proxy). The virtual wallet server receives 726 the authorization response message from the payment network and continues processing of the original use transaction. If, in step 728, the authorization request has been declined by the RFI then the process again branches back to step 708 wherein the virtual wallet server generates a decline response. The decline response is routed 710 to the originating PSP, which in turn responds 712 to the consumer with a decline message. As explained above, in some embodiments, the originating PSP transmits the decline message to a consumer device (such as a mobile telephone) and/or to a merchant device (such as a laptop computer). However, if in step 728 the authorization request has been approved by the RFI, then the virtual wallet server generates 730 an authorization approval message, and the approval message is transmitted 732 to the originating PSP. In this case, the originating PSP then responds to the consumer with an approval message.

Accordingly, in the auto-load virtual wallet peer-to-peer purchase transaction process 700 the virtual wallet server must validate the consumer, and both the funding account issuer FI and the receiving account issuer FI (RFI) must approve the transaction, before the virtual wallet server transmits an approval message to the originating PSP.

It should be understood that some (or all) of the virtual wallet server processing steps described above with regard to FIG. 7 can be eliminated if the virtual wallet server determines that the authorization request from the originating PSP is for an "on-us" payment transaction. In such a case, the authorization request is granted immediately by the virtual wallet server and an authorization response message is transmitted to the originating PSP. As explained above, an "on-us" funding transaction is defined as a purchase transaction (which may be subject to a limit or other restriction) in which an approval decision (payment authorization) can be made without consulting a funding account holder (such as a credit card issuer FI). For example, the credit card issuer FI may have one or more agreements in place with one or more PSPs and/or with the virtual wallet server to approve all purchase transactions for purchases of $30 (thirty) dollars or less. Such "on-us" payment transaction agreements can be put in place to speed up processing of relatively inexpensive purchases for the convenience of merchants and/or consumers. In such cases, after the payment authorization request is granted the virtual wallet server performs further processing to debit the consumer's funding account.

It should also be understood that the virtual wallet peer-to-peer purchase transaction process 700 of FIG. 7, and the auto-load virtual wallet purchase transaction process 500 of FIG. 5, permit consumers to utilize decoupled debit PSP accounts with zero balances for the purchase of goods and services and for making peer-to-peer payments. In particular, by utilizing the apparatus, systems and processes described herein, a consumer's virtual wallet account that contains no funds or a very small amount of funds can still be utilized to pay for goods or services because that virtual wallet account will be automatically loaded or incremented with funds in an amount to match the payment transaction amount. Thus, the requirement for consumers to prepay for stored value is eliminated. Furthermore, consumers can better manage their funds by no longer spreading their funds over multiple decoupled debit accounts. In addition, enabling consumers to auto-load their decoupled debit account for the full transaction amount at the time of the payment transaction (real time) enhances the consumer's experience with their payment card by eliminating declines due to insufficient funds in the decoupled debit account.

Figure 8:
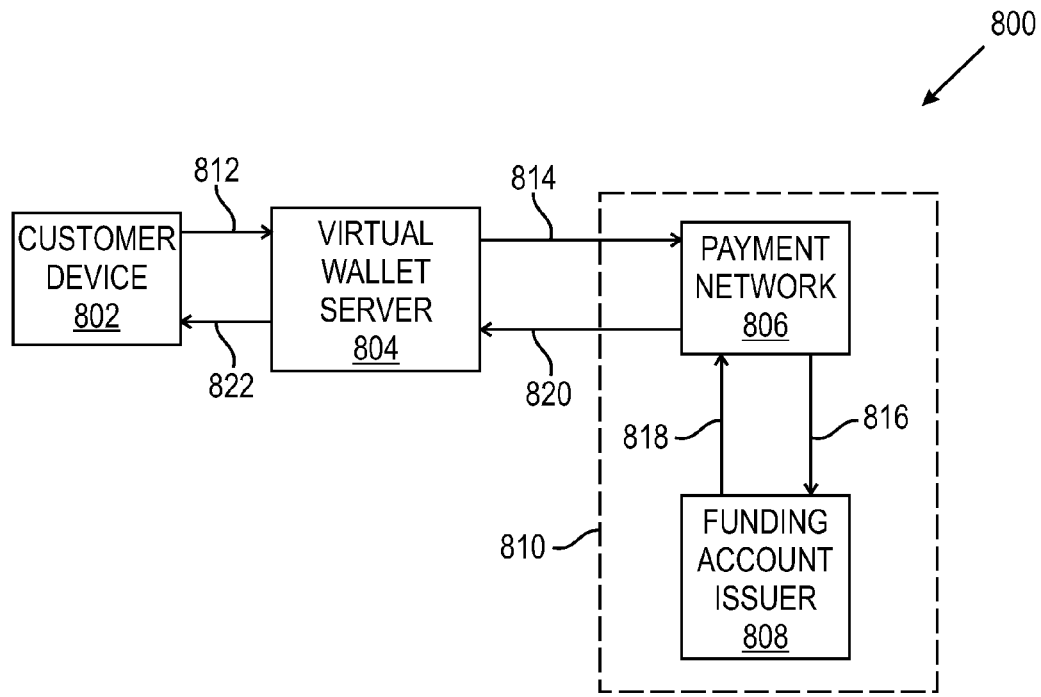
FIG. 8 is a block diagram that illustrates a virtual wallet automatic-loading (or scheduled loading) system according to an embodiment of the invention.

FIG. 8 is a block diagram that illustrates a virtual wallet scheduled-loading system 800 for processing a consumer's auto-load parameter update request in accordance with novel aspects disclosed herein. The various components shown in FIG. 8 may be a subset of a larger system generally indicated by reference numeral 800, for facilitating a virtual wallet auto-loading request initiated by a consumer. In the example embodiment illustrated in FIG. 8, the components of the system 800 that are shown operating with respect to a single payment network and funding account issuer, but multiple payment networks and funding account issuers may be associated with a single virtual wallet account.

The system 800 includes a virtual wallet server 804 which receives requested auto-load parameters from a consumer device 802 (such as a laptop computer, PDA or smart phone) used by the consumer to request new or updated automatic-loading capabilities associated with her virtual wallet account. The system 800 also includes an authorization system 810 that includes a payment network 806 and a funding account issuer FI 808. The virtual wallet server 804 and the components of the authorization system 810 (the payment network 806 and the funding account issuer 808) can, in some embodiments, also be understood to represent computer systems operated by or on behalf of a consumer issuer FI. The arrows 812, 814 and 816 trace the path of an auto-loading parameter update request transaction, which begins when the consumer transmits a request to the virtual wallet server 804 to update her auto-load parameters, which request is then routed to the authorization system 810 for processing. The arrows 818, 820 and 822 trace the path of an approval message or a decline message, depending on the results of the processing by one or both of the virtual wallet server 804 and the components of the authorization system 810. Details involving scheduled-load parameter processing will be explained below with reference to FIG. 9.

Figure 9:
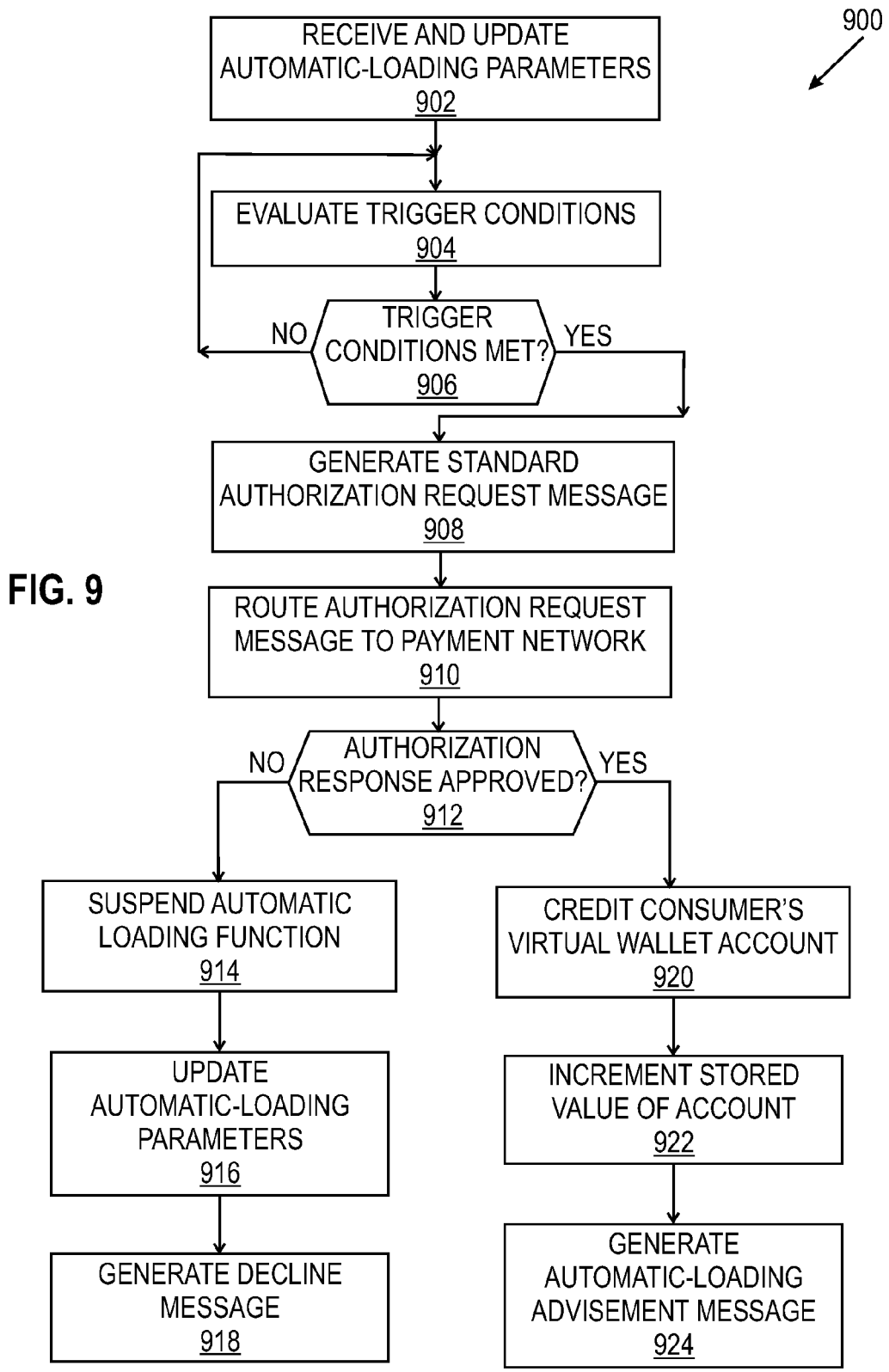
FIG. 9 is a flowchart illustrating a scheduled-loading virtual wallet process according to an embodiment of the invention.

FIG. 9 is a flowchart illustrating an embodiment of a scheduled-loading virtual wallet process 900. A consumer transmits a request to a virtual wallet server self-care portal and inputs automatic-loading capabilities and/or parameters associated with her virtual wallet account. For example, the consumer may access her virtual wallet account by logging on to a virtual wallet server from a browser application resident on her laptop. A menu of options may be provided to the consumer for customizing her virtual wallet account by adding or changing auto-load parameters. The virtual wallet server receives and then updates 902 the automatic-loading parameters by storing the auto-load parameters in an auto-load database. Periodically, or resulting from a predefined event, the virtual wallet server evaluates 904 trigger conditions associated with individual virtual wallet accounts. If, in step 906 the trigger conditions are not met, then the process branches back to step 904 and the virtual wallet server continues monitoring trigger conditions. If one or more trigger conditions are met, the virtual wallet server (acting as a pseudo-acquirer) generates 908 a standard authorization request message for the purchase of stored value with users funding the PAN, and includes other purchase transaction details. The virtual wallet server (acting as an acquirer-proxy) routes 910 the authorization message with the transaction details and the funding account PAN to a payment network authorization system according to standard processes. The payment network authorization system then routes the authorization request to the funding account issuer, and the funding account issuer applies standard business processes to either approve or decline the request. In some embodiments, the funding account issuer generates an authorization response message to the payment network authorization system for transmission to the virtual wallet server (acting as acquirer proxy). The virtual wallet server receives 912 the authorization response message, and if the authorization response message is a decline (not approved), then the virtual wallet server suspends 914 the auto-loading function to prevent subsequent and/or multiple authorization requests. The virtual wallet server then updates 916 the auto-load parameters database associated with consumer's virtual wallet account, and generates 918 a decline message advising of the failed auto-load transaction and requirement to reactivate auto-load parameters. In some embodiments, the virtual wallet server also sends 918 an auto-load decline message to the consumer so that she is aware that the auto-load parameters she requested for her virtual wallet account are not in effect. In some embodiments, the consumer would be required to login to her virtual wallet account to request reinstatement of her auto-load criteria and/or parameters, or to request a fresh set of auto-load criteria and/or parameters. Referring again to step 912, if the authorization response message is an approval, then the virtual wallet server loads or credits 920 the end user's (consumer's) virtual wallet account. The virtual wallet server also loads or increments 922 the stored value of the end-user's virtual wallet account, and generates 924 an auto-load advisement message containing virtual wallet account loading transaction details and an updated virtual wallet account balance. The virtual wallet account loading transaction details may include, for example, the amount of money loaded, the time and date of loading, and identification of the consumer's funding account or accounts. In some embodiments, the virtual wallet server sends the auto-load advisement message with the virtual wallet account information to the consumer for viewing, for example, on a display screen of her consumer device (i.e., a text message for viewing on her mobile telephone display).

Figure 10:
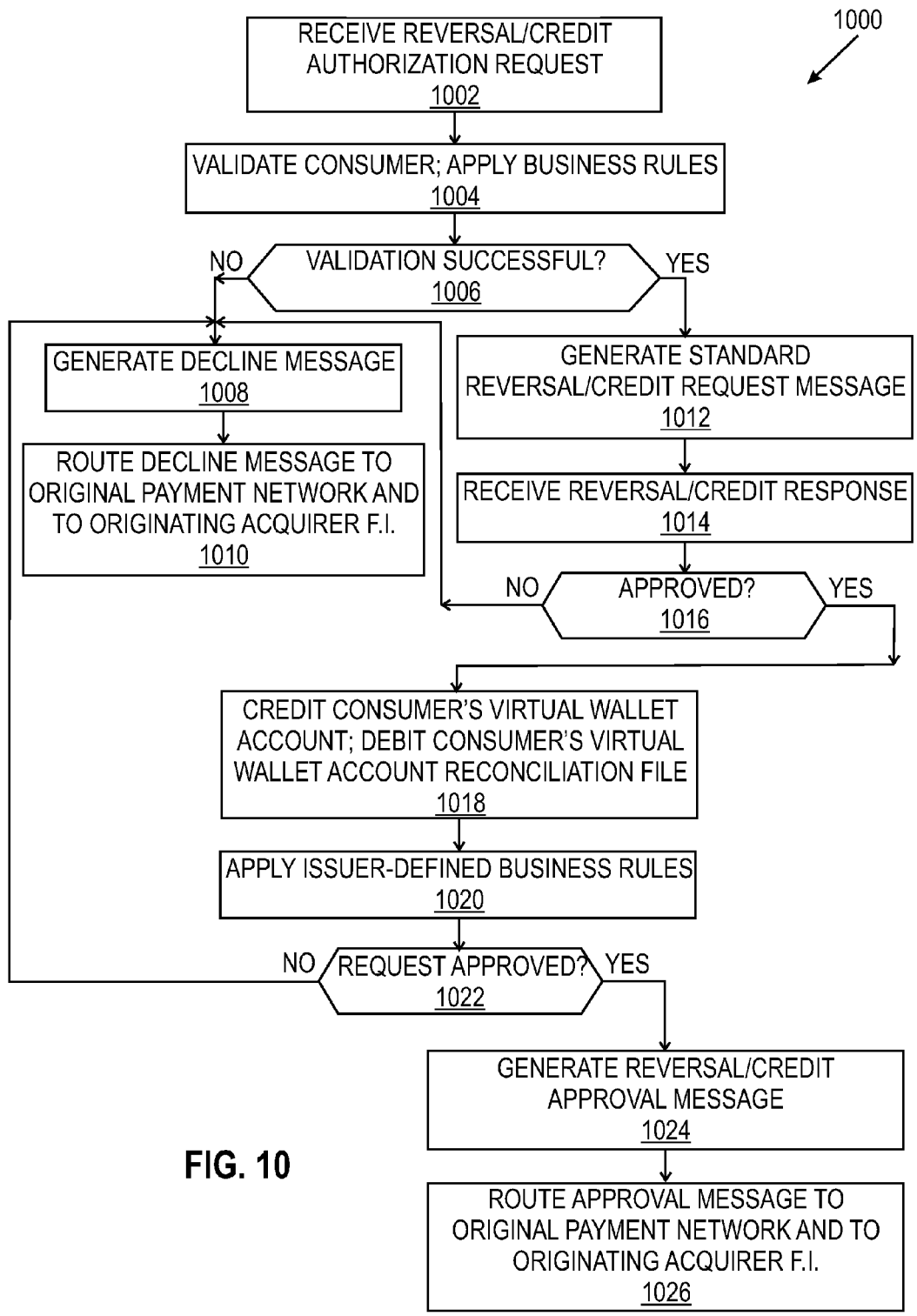
FIG. 10 is a flowchart illustrating an automatic loading reversal or credit transaction process for a virtual wallet account according to an embodiment of the invention.

FIG. 10 is a flowchart illustrating an embodiment of an automatic loading reversal or credit transaction process 1000 for a virtual wallet account. It should be understood that the block diagram of FIG. 4, which illustrates a virtual wallet system 400 configured for processing a virtual wallet purchase transaction with automatic loading, may also be configured for processing an automatic loading reversal or credit transaction process like that of process 1000. For example, referring to FIG. 4, an acquirer FI 402 submits a charge reversal or credit (reversal/credit) authorization request to a payment network 404 with a virtual wallet account number (pseudo-PAN) as the funding account. The payment network 404 then routes the reversal/credit authorization request to the virtual wallet server 406, which processes the charge reversal/credit request and then routes it to the payment network authorization system 408 according to standard processes. The payment network authorization system 408 next routes the reversal/credit authorization request to the funding account issuer FI 410, which applies business rules to either approve or decline the reversal/credit authorization request. The funding account issuer FI 410 transmits a response message which is routed through the payment network authorization system 408 to the virtual wallet server 406 where further processing may occur. The virtual wallet server then transmits the response message, which is either an approval or a decline message, to the original payment network 404 which routes it to the originating acquirer FI 402. It should be understood that other virtual wallet system configurations, which may contain more or less components, could also be used. It should also be understood that the process links the use (payment) transaction and the associated auto-load transaction to facilitate charge reversals and credits.

Referring again to FIG. 10, the automatic-loading reversal or credit transaction process 1000 begins when the virtual wallet server receives 1002 a reversal/charge authorization request, wherein the virtual wallet server is acting as a virtual wallet account issuer's agent. In some embodiments, the virtual wallet server processes the authorization request by first interrogating a PAN mapping database and then mapping the virtual wallet account PAN to one or more funding account PANs. The virtual wallet server then validates 1004 the consumer and applies issuer-defined business rules. For example, the business rules can include applying CVC data, transaction limits, and risk scoring, and/or may include adding convenience fees and/or subtracting promotional and/or loyalty credits, and the like. Thus, the virtual wallet server utilizes PAN mapping and applies the business rules (if any) to an account in order to determine if the authorization request is for a valid user (consumer) and a valid transaction. In step 1006, if the user is not validated (the validation is unsuccessful), then the virtual wallet server generates 1008 a decline response and a decline message is routed 1010 to the original payment network and to the originating acquirer.

However, if in step 1006, the PAN mapping and user validation are successful, then the virtual wallet server (acting as a pseudo-acquirer) generates 1012 a standard reversal/credit request message for the charge reversal or credit with users funding the PAN. The reversal/credit request message includes the original merchant ID and other purchase transaction details (i.e., the original transaction details) from the original reversal/credit request transmitted by the acquirer FI. The virtual wallet server (now acting as an acquirer-proxy) also routes the reversal/credit request message with the original transaction details and the funding account PAN to a payment network authorization system according to standard processes. The payment network authorization system then routes the reversal/credit request message to the funding account issuer(s). Each funding account issuer applies standard business processes to either approve or decline the reversal/credit request, and then each issuer generates a reversal/credit response message to the payment network authorization system. The virtual wallet server (now acting as acquirer proxy) receives 1014 the reversal/credit response(s). If, in step 1016 the reversal/credit response is not approved (i.e., a decline, or negative response), then the process branches back to step 1008 wherein the virtual wallet server generates a decline message which is routed 1010 to the payment network and then to originating acquirer. In some embodiments, the originating acquirer then transmits the decline message to a merchant device (such as a POS terminal, mobile device, PDA device, tablet computer, desktop computer, and/or a laptop) and/or to a consumer device (such as a mobile device, PDA device, tablet computer, desktop computer, and/or a laptop).

However, if in step 1016 the reversal/credit response is an approval (a positive response), then the virtual wallet server credits 1018 the end user's (consumer's) virtual wallet account and debits the consumer's virtual wallet account reconciliation file. In some embodiments, the virtual wallet server also resumes processing of the original acquirer reversal/credit request with the virtual wallet account PAN. The virtual wallet server (acting as the issuer proxy) applies 1020 other issuer-defined business rules to determine if the reversal/credit request should be approved or declined. If, in step 1022 the virtual wallet server declines the reversal/credit request, then the process branches to step 1008 wherein the virtual wallet server generates 1008 a decline message which is routed 1010 to the originating payment network and to the originating acquirer, as explained above.

However, if in step 1022 the virtual wallet server approves the reversal/credit request, then the virtual wallet server generates 1024 a reversal/credit approval message and routes 1026 it to the original payment network (responsive to the original authorization request message) and to the originating acquirer.

It should be understood that some (or all) of the virtual wallet server processing steps described above with regard to FIG. 10 can be eliminated if the virtual wallet server determines that the reversal/credit request from the originating acquirer FI is for an "on-us" transaction. In such a case, the reversal/credit request is approved immediately by the virtual wallet server and an approved reversal/credit response message is transmitted to the original acquirer FI. As explained above, an "on-us" transaction is defined as a transaction (which may be subject to a limit or other restriction) in which an approval decision (such as a reversal and/or credit authorization) can be made without consulting a funding account holder (such as a credit card issuer FI). For example, the credit card issuer FI may have one or more agreements in place with one or more PSPs and/or acquirer FIs to approve all reversal/credit requests that involve amounts of $50 (fifty) dollars or less. Such "on-us" transaction agreements can be put in place to speed up processing or may be utilized for the convenience of merchants and/or of customers. In such cases, after the reversal/credit request is granted the virtual wallet server performs further processing to credit the consumer's funding account and/or to reverse the charge applied to the consumer's funding account.

Figure 11:
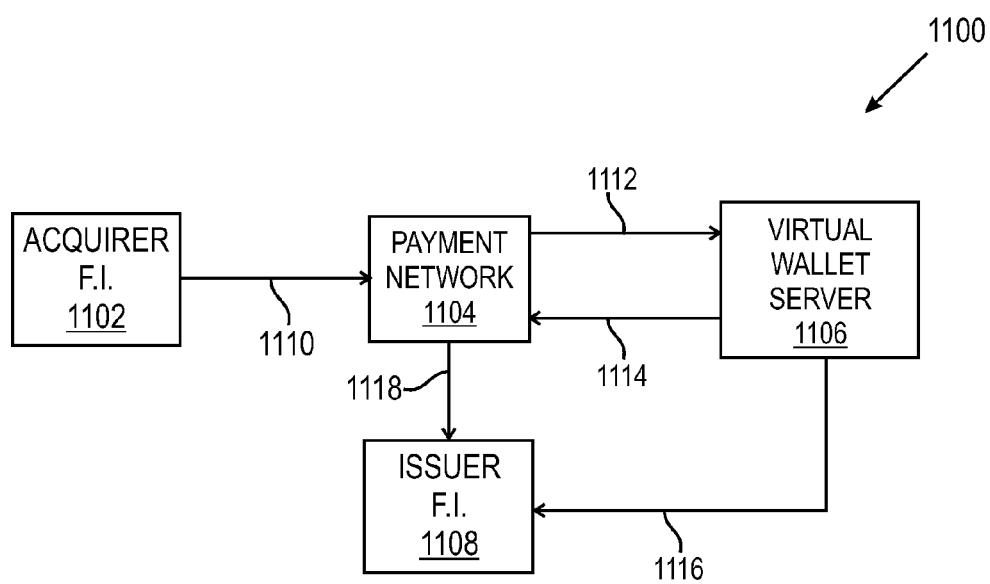
FIG. 11 is a block diagram of a system configured for processing an automatic-loading virtual wallet settlement process request according to an embodiment of the invention.

FIG. 11 is a block diagram of a system 1100 configured for processing an automatic-loading virtual wallet settlement process request in accordance with novel aspects disclosed herein. In particular, the automatic-loading virtual wallet settlement process system 1100 includes an acquirer FI 1102, a payment network 1104, a virtual wallet server 1106, and a funding account issuer FI 1108. In some embodiments, a settlement process is initiated at an end-of-period (such as the end of a day) by the virtual wallet server 1106, for example, by generating an issuer proxy debit/credit file from period activity as an issuer proxy and handing off the debit/credit file to an issuer proxy reconciliation process. At the same end-of-period time frame, the acquirer FI 1002 initiates a clearing process and transmits clearing files to a payment network 1104. The payment network processes the clearing files and also sends them to the virtual wallet server issuer proxy reconciliation process. Ultimately, the virtual wallet server 1106 transmits a final reconciliation and/or settlement advisement file to the appropriate issuer 1108, and the payment network 1104 provides settlement advisement files to the appropriate issuer 1108. Arrows 1110, 1112 and 1114 trace the path of initiating an automatic-loading settlement or clearing process, and arrows 1116 and 1118 trace the path of transmission of the final reconciliation and/or settlement files to the appropriate issuer 1108. Details of the process are discussed below with regard to FIG. 12.

Figure 12:
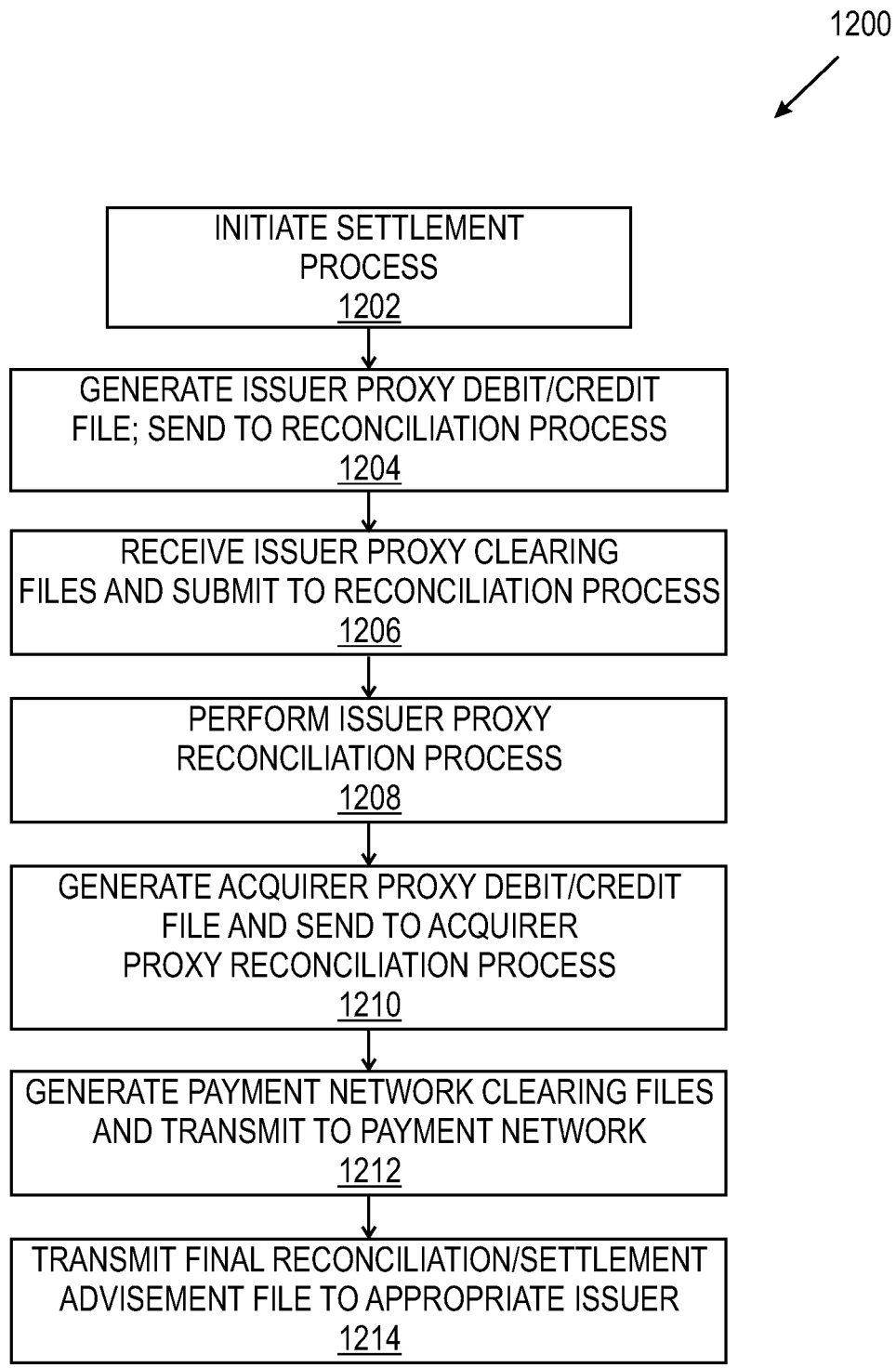
FIG. 12 is a flowchart illustrating an automatic-loading virtual wallet system settlement process according to an embodiment of the invention.

FIG. 12 is a flowchart illustrating an embodiment of an automatic-loading virtual wallet system settlement process 1200 in accordance with novel aspects described herein. In particular, at the end-of-period (which may be the end of the day, or some other ending point such as a predefined particular time of day and/or day of the week) the virtual wallet server initiates 1202 the settlement process. The virtual wallet server value store then generates 1204 an issuer proxy debit/credit file from the period activity (which is also a predefined period of time, which can be 24 hours or some other time period) as an issuer proxy. The virtual wallet server next hands off the issuer proxy debit/credit file to an issuer proxy reconciliation process. At the same end-of-period time (for example, at the end of the day, or at the predefined time of day) an acquirer FI initiates a clearing process by sending clearing files to a payment network , and the payment network processes the acquirer FI clearing files. The virtual wallet server then receives 1206 the issuer proxy clearing files from the payment network and submits the clearing files to the virtual wallet issuer proxy reconciliation process. The virtual wallet server performs 1208 an issuer proxy reconciliation process by matching the acquirer FI clearing file debits and credits to the issuer proxy account credits and debits, and then sends the reconciliation file to a final reconciliation process. The virtual wallet server value store then generates 1210 an acquirer proxy debit/credit file from the period activity as an acquirer proxy, and hands off the acquirer proxy debit/credit file to an acquirer proxy reconciliation process. Next, the virtual wallet acquirer reconciliation process generates 1212 payment network clearing files as acquirer proxy, and the virtual wallet server sends the acquirer proxy clearing file to the payment network. The payment network then processes the clearing files and provides settlement advisement files to the appropriate issuer. In addition, the virtual wallet server transmits 1214 a final reconciliation /settlement advisement file to the appropriate issuer.

Figure 13:
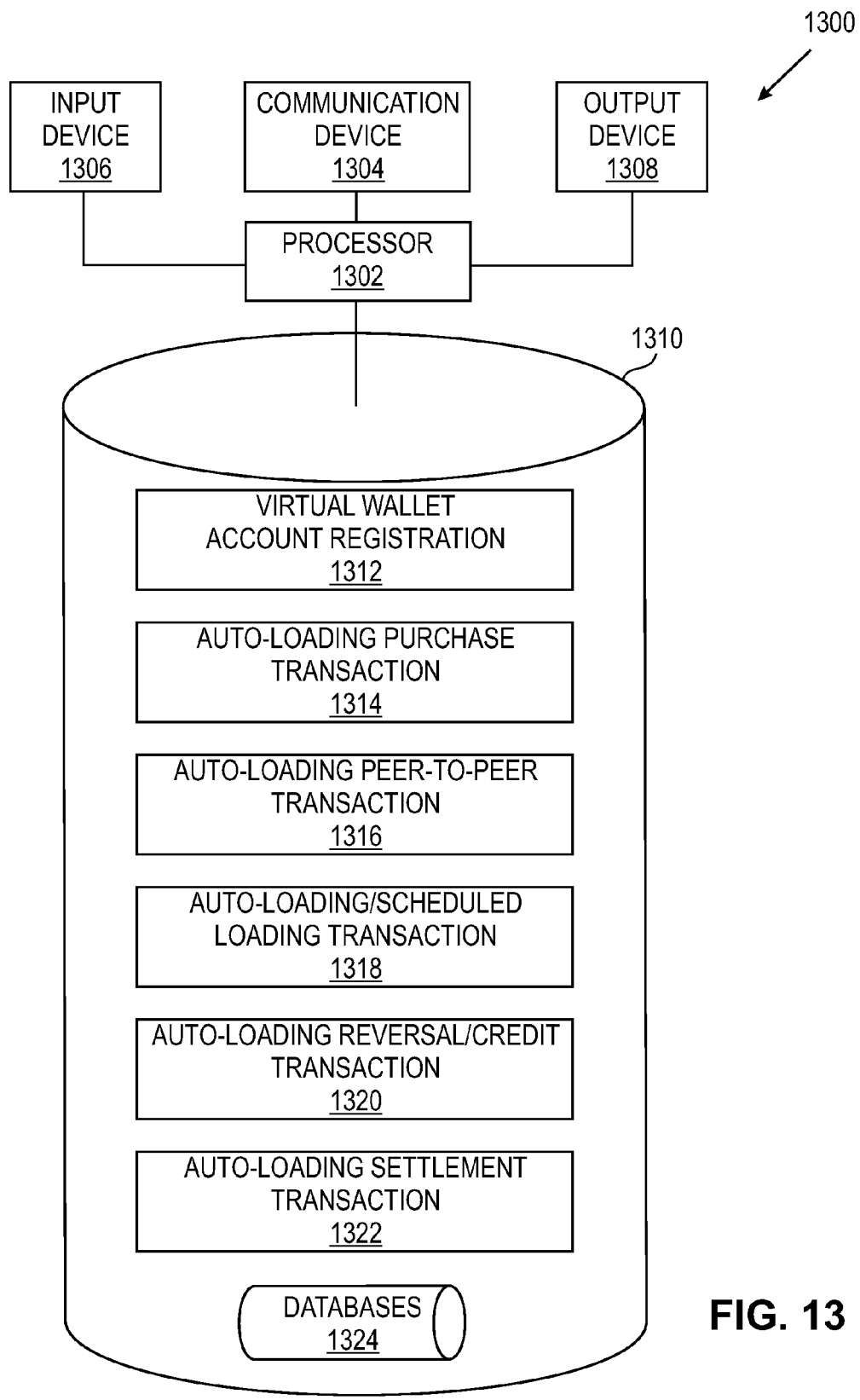
FIG. 13 is a block diagram of the Virtual Wallet Server computer according to an embodiment of the invention.

FIG. 13 is a block diagram of the Virtual Wallet Server computer 1300. The Virtual Wallet server computer may be conventional in its hardware aspects but may be controlled by software to cause it to operate in accordance with aspects of the methods presented herein. In particular, the Virtual Wallet Server computer 1300 may include a computer processor 1302 operatively coupled to a communication device 1304, an input device 1306, an output device 1308, and a storage device 1310.

The computer processor 1302 may constitute one or more conventional processors. Processor 1302 operates to execute processor-executable steps, contained in program instructions described herein, so as to control the Virtual Wallet Server computer 1302 to provide desired functionality.

Communication device 1304 may be used to facilitate communication with, for example, other devices (such as an acquirer computer or an issuer computer). Communication device 1304 may, for example, have capabilities for engaging in data communication over conventional computer-to-computer data networks. Such data communication may be in digital form and/or in analog form.

Input device 1306 may comprise one or more of any type of peripheral device typically used to input data into a computer. For example, the input device 1306 may include a keyboard and a mouse and/or a touchpad. Output device 1308 may comprise, for example, a display and/or a printer.

Storage device 1310 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory devices. Any one or more of the listed storage devices may be referred to as a "memory", "storage", "storage medium" or "computer readable medium".

Storage device 1310 stores one or more programs for controlling processor 1302. The programs comprise program instructions that contain processor-executable process steps of Virtual Wallet Server computer 1300, including, in some cases, process steps that constitute processes provided in accordance with principles of the processes presented herein. The programs may include an application 1312 that manages a process by which consumers (i.e., cardholders) may register themselves and/or their mobile devices, for example, with the Virtual Wallet Server computer 1300. In some embodiments, the virtual wallet account registration process may allow the cardholders to register themselves with the Virtual Wallet Server computer 1300 by accessing, for example via their mobile telephone or tablet computer (not shown), a suitable web page hosted by the Virtual Wallet Server computer 1300. The information gathered from the consumer (cardholder) during the registration process may include payment card account number and mobile telephone number (or other mobile identifier). The registration process may also require the cardholder to select a mobile personal identification number (M-PIN) to be used for security purposes in connection with, for example, payment card virtual wallet system purchase transactions to be initiated by the cardholder. In addition or alternatively, the registration of cardholders with the Virtual Wallet Server computer 1300 may be a batch process in which issuers of the cardholders' payment card accounts transfer information about the cardholders to the Virtual Wallet Server computer 1300. Details concerning the virtual wallet account registration process have been provided herein, especially with reference to FIGS. 2 and 3.

The storage device 1310 may also store applications 1314 and 1316 for controlling the Virtual Wallet Server computer 1300 to provide for auto-load purchase transactions and auto-load peer-to-peer transactions for the cardholders. Details of the automatic-loading purchase transaction process have been provided herein with reference to FIGS. 4 to 7.

Still another application 1318 may be stored by the storage device 1310 and may control the Virtual Wallet Server computer 1300 to provide automatic loading and/or scheduled loading for a virtual wallet account holder. Details of operation of the automatic loading and/or scheduled loading application 1318 in accordance with various aspects have been discussed herein with reference to FIGS. 8 and 9.

In addition, an application 1320 may be stored by the storage device 1310, and may control the Virtual Wallet Server computer 1300 to provide for automatic loading reversal and/or credit transactions for a consumer's virtual wallet account. Details of operation of such a virtual wallet account automatic- loading reversal/credit transaction in accordance with various aspects have been discussed with reference to FIG. 10.

Still further, the storage device 1310 may store an application 1322 for controlling the Virtual Wallet Server computer 1300 to provide for virtual wallet account settlement at the end of a period. Details of operation of the virtual wallet account settlement application 1322 in accordance with various aspects have been discussed herein with reference to FIGS. 11 and 12.

Reference numeral 1324 in FIG. 4 identifies one or more databases that are maintained by the Virtual Wallet Server computer 1300 on the storage device 1310. Among these databases may be, for example, a consumer database, a merchant database, an issuer database, an acquirer database, an automatic-loading parameter database, and a transaction database.

The application programs of the Virtual Wallet Server computer 1300, as described above, may be combined in some embodiments, as convenient, into one, two or more application programs. Moreover, the storage device 1310 may store other programs or applications, such as one or more operating systems, device drivers, database management software, web hosting software, and the like.

The flow charts and descriptions appearing herein should not be understood to prescribe a fixed order of performing the method steps described therein. Rather the method steps may be performed in any order that is practicable.

As used herein and in the appended claims, the term "payment card account" includes a credit card account or a deposit account that the account holder may access, for example, by using a debit card. The term "payment card account number" includes a number that identifies a payment card account or a number carried by a payment card, or a number that is used to identify an account in a payment system that handles debit card and/or credit card transactions or to route a transaction in a payment system that handles debit card and/or credit card transactions. The term "payment card" includes a credit card or a debit card (including a pre-paid debit card). The term "payment card account" also includes an account to which a payment card account number is assigned. Thus, a payment card account may include an account to which payment transactions may be routed by a payment system that handles debit card and/or credit card transactions, even if the account in question is not eligible to be charged for purchase transactions or other transactions. A payment card account may also include an account from which payment transactions may be routed by a payment system that handles debit card and/or credit card transactions, even if the account in question is not customarily used, or is not eligible, to be charged for purchase transactions.

As used herein and in the appended claims, the term "virtual wallet account" includes a consumer account that may be hosted, for example, by a virtual wallet server computer, and that can be accessed by the consumer account holder for use in purchase transactions involving a payment card.

The account numbers that identify the consumer's virtual wallet account, that identify the merchants' accounts, and that identify other recipients' payment card accounts, herein may be in a format and in an account number range that allows payment transactions to be routed to the accounts in question.

Although specific exemplary embodiments have been described herein, it should be understood that various changes, substitutions, and alterations apparent to those skilled in the art can be made to the disclosed embodiments without departing from the spirit and scope of the invention as set forth in the appended claims.

What is claimed is:

1. A method comprising:
   receiving, at a virtual wallet server from a payment network, a virtual wallet account number for a virtual wallet account of a consumer and payment transaction details of a payment transaction, wherein the payment transaction details includes a payment amount;
   mapping, by the virtual wallet server, the virtual wallet account number to at least one funding account associated with the consumer;
   validating, by the virtual wallet server, the consumer and the payment transaction details;
   generating a standard purchase authorization request message for the payment transaction and routing the standard purchase authorization request message to a payment network authorization system for routing to an issuer of the at least one funding account;
   receiving, at the virtual wallet server acting as an original acquirer proxy, an authorization response from the payment network authorization system approving the payment transaction;
   loading the consumer's virtual wallet account in real time to match the payment amount; and
   routing, by the virtual wallet server to the payment network, an authorization approval message for routing to an originating acquirer.

2. The method of claim 1, further comprising, prior to routing the authorization approval message:
   validating, by the virtual wallet server acting as an issuer proxy, that the virtual wallet account balance is sufficient; and
   applying issuer-defined business rules.

3. The method of claim 2, further comprising:
   generating a decline message if at least one of the virtual wallet account balance is insufficient and at least one issuer-defined business rule has not been followed; and
   routing the decline message to an originating acquirer financial institution.

4. The method of claim 2, wherein applying business rules comprises at least one of applying CVC data, applying transaction limits, applying risk scoring, adding convenience fees, adding loyalty credits, subtracting promotional credits, and subtracting loyalty credits.

5. The method of claim 1, further comprising, prior to routing the authorization approval message to the originating acquirer, routing the authorization approval message to an original payment network.

6. The method of claim 1, wherein mapping comprises interrogating, by the virtual wallet server, a primary account number database.

7. The method of claim 1, wherein the payment transaction details comprise at least one data element listed by the ISO 8583 financial transaction standard.

8. The method of claim 1, wherein validating comprises applying at least one issuer financial institution business rule to at least one of the consumer's virtual wallet account and the payment transaction details.

9. The method of claim 1, further comprising loading the consumer's virtual wallet account with a preset amount of funds when at least one predetermined condition has been met.

10. The method of claim 1, further comprising:
   processing, by the virtual wallet server, a reversal authorization request to reverse a charge made to the consumer's virtual wallet account;
   validating, by the virtual wallet server, the consumer and the payment transaction to be reversed by applying issuer-defined business rules;
   generating a standard reversal request message for the charge reversal with at least one funding account primary account number (PAN);

routing the standard reversal request message to a payment network authorization system;

receiving at least one reversal response approving the reversal request from the payment network authorization system; and crediting, by the virtual wallet server, the consumer's virtual wallet account.

11. The method of claim 10, wherein processing the reversal authorization request comprises interrogating a PAN mapping database and mapping the virtual wallet account number to at least one funding account PAN.

12. The method of claim 10, wherein the standard reversal request message includes purchase transaction details including an original merchant ID.

13. The method of claim 10, further comprising debiting a consumer's virtual wallet account reconciliation file.

14. The method of claim 1, further comprising, prior to receiving the virtual wallet account number:

receiving, by a virtual wallet registration system, a request from the consumer to register at least one payment card account with the virtual wallet server; and receiving registration information associated with the at least one payment card account that includes funding account payment credentials and payment service provider (PSP) payment service information.

15. The method of claim 14, wherein the registration information further comprises auto-load capabilities and parameters.

16. The method of claim 14, further comprising:

generating, by the virtual wallet server, a payments authorization request message that includes a funding account primary account number (PAN);

routing the payments authorization request message to a payments network for transmission to a funding account issuer associated with the at least one payment card account;

receiving, by the virtual wallet server from the payments network, an approval of the payments authorization request; and generating, by the virtual wallet server, a user profile associated with the consumer and storing it in an account mapping data store.

17. A non-transitory computer readable medium storing instructions for controlling a processor, the instructions configured to cause the processor to:

receive from a payment network a virtual wallet account number for a virtual wallet account of a consumer and payment transaction details of a payment transaction, wherein the payment transaction details includes a payment amount;

map the virtual wallet account number to at least one funding account associated with the consumer;

validate the consumer and the payment transaction details;

generate and transmit a standard purchase authorization request message for the payment transaction to a payment network authorization system for routing to an issuer of the at least one funding account;

receive an authorization response from the payment network authorization system approving the payment transaction;

load the consumer's virtual wallet account in real time to match the payment amount; and transmit an authorization approval message to the payment network for routing to an originating acquirer.

* * * * *